US008861785B2

(12) United States Patent
Oi et al.

(10) Patent No.: US 8,861,785 B2
(45) Date of Patent: Oct. 14, 2014

(54) INFORMATION PROCESSING DEVICE, INFORMATION PROCESSING METHOD AND PROGRAM

(75) Inventors: Kenichiro Oi, Kanagawa (JP); Masaki Fukuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 445 days.

(21) Appl. No.: 12/855,075

(22) Filed: Aug. 12, 2010

(65) Prior Publication Data
US 2011/0044504 A1 Feb. 24, 2011

(30) Foreign Application Priority Data
Aug. 21, 2009 (JP) ................ P2009-192091

(51) Int. Cl.
*G06K 9/00* (2006.01)
*G06T 7/00* (2006.01)
(52) U.S. Cl.
CPC .................... *G06T 7/0042* (2013.01)
USPC ........... 382/103; 382/154; 382/153; 345/644; 345/473; 345/633
(58) Field of Classification Search
CPC ................. G06T 7/0075; G06T 2007/10012; G06T 2007/10016; G06K 9/3241; G06K 9/00201; B25J 9/1697
USPC ........... 382/154, 103, 153; 345/644, 473, 633
See application file for complete search history.

(56) References Cited

U.S. PATENT DOCUMENTS

2007/0265741 A1 11/2007 Oi et al.

OTHER PUBLICATIONS

European Search Report from the European Patent Office in Munich for corresponding European Application No. EP 10 16 6796 dated Jan. 12, 2011.
Piniés, et al., "Large-Scale SLAM Building Conditionally Independent Local Maps: Application to Monocular Vision", IEEE Transactions on Robotics, vol. 24, No. 5, pp. 1094-1106, (Oct. 1, 2008).
Blanco, et al., "Subjective local maps for hybrid metric-topological SLAM", Robotics and Autonomous Systems, Elsevier Science Publishers, vol. 57, No. 1, pp. 64-74, (Jan. 31, 2009).
Davison, et al., "MonoSLAM: Real-Time Single Camera SLAM", IEEE Transactions on Pattern Analysis and Machine Intelligence, IEEE Service Center, vol. 29, No. 6, pp. 1052-1067, (Jun. 1, 2007).

*Primary Examiner* — Ruiping Li
(74) *Attorney, Agent, or Firm* — Finnegan, Henderson, Farabow, Garrett & Dunner, LLP

(57) ABSTRACT

An information processing device, including: a three-dimensional information generating section for obtaining position and attitude of a moving camera or three-dimensional positions of feature points by successively receiving captured images from different viewpoints, and updating status data using observation information which includes tracking information of the feature points, the status data including three-dimensional positions of the feature points within the images and position and attitude information of the camera; and a submap generating section for generating submaps by dividing an area for which the three-dimensional position is to be calculated. The three-dimensional information generating section obtains position and attitude of the camera or three-dimensional positions of the feature points by generating status data corresponding to the submaps not including information about feature points outside of a submap area for each of the generated submaps and updating the generated status data corresponding to the submaps.

19 Claims, 26 Drawing Sheets

FIG. 2

STATUS REPRESENTATION: MULTIDIMENSIONAL NORMAL DISTRIBUTION (a) MEAN VECTOR $$\vec{X} = \begin{bmatrix} x \\ \omega \\ \dot{x} \\ \dot{\omega} \\ P_1 \\ \vdots \\ P_N \end{bmatrix} \begin{matrix} \text{CAMERA POSITION} \\ \text{CAMERA ATTITUDE} \\ \text{CAMERA SPEED} \\ \text{CAMERA ANGULAR SPEED} \\ \text{POSITION OF FEATURE POINT \#1} \\ \\ \text{POSITION OF FEATURE POINT \#N} \end{matrix}$$

(b) VARIANCE-COVARIANCE MATRIX $$\Sigma_{xx} = \begin{bmatrix} \sigma_{xx} & \cdots & \sigma_{x\dot{\omega}} & \sigma_{xP_1} & \cdots & \sigma_{xP_N} \\ \vdots & \ddots & \vdots & \vdots & \ddots & \vdots \\ \sigma_{\dot{\omega}x} & \cdots & \sigma_{\dot{\omega}\dot{\omega}} & \sigma_{\dot{\omega}P_1} & \cdots & \sigma_{\dot{\omega}P_N} \\ \sigma_{P_1 x} & \cdots & \sigma_{P_1 \dot{\omega}} & \sigma_{P_1 P_1} & \cdots & \sigma_{P_1 P_N} \\ \vdots & \ddots & \vdots & \vdots & \ddots & \vdots \\ \sigma_{P_N x} & \cdots & \sigma_{P_N \dot{\omega}} & \sigma_{P_N P_1} & \cdots & \sigma_{P_N P_N} \end{bmatrix}$$

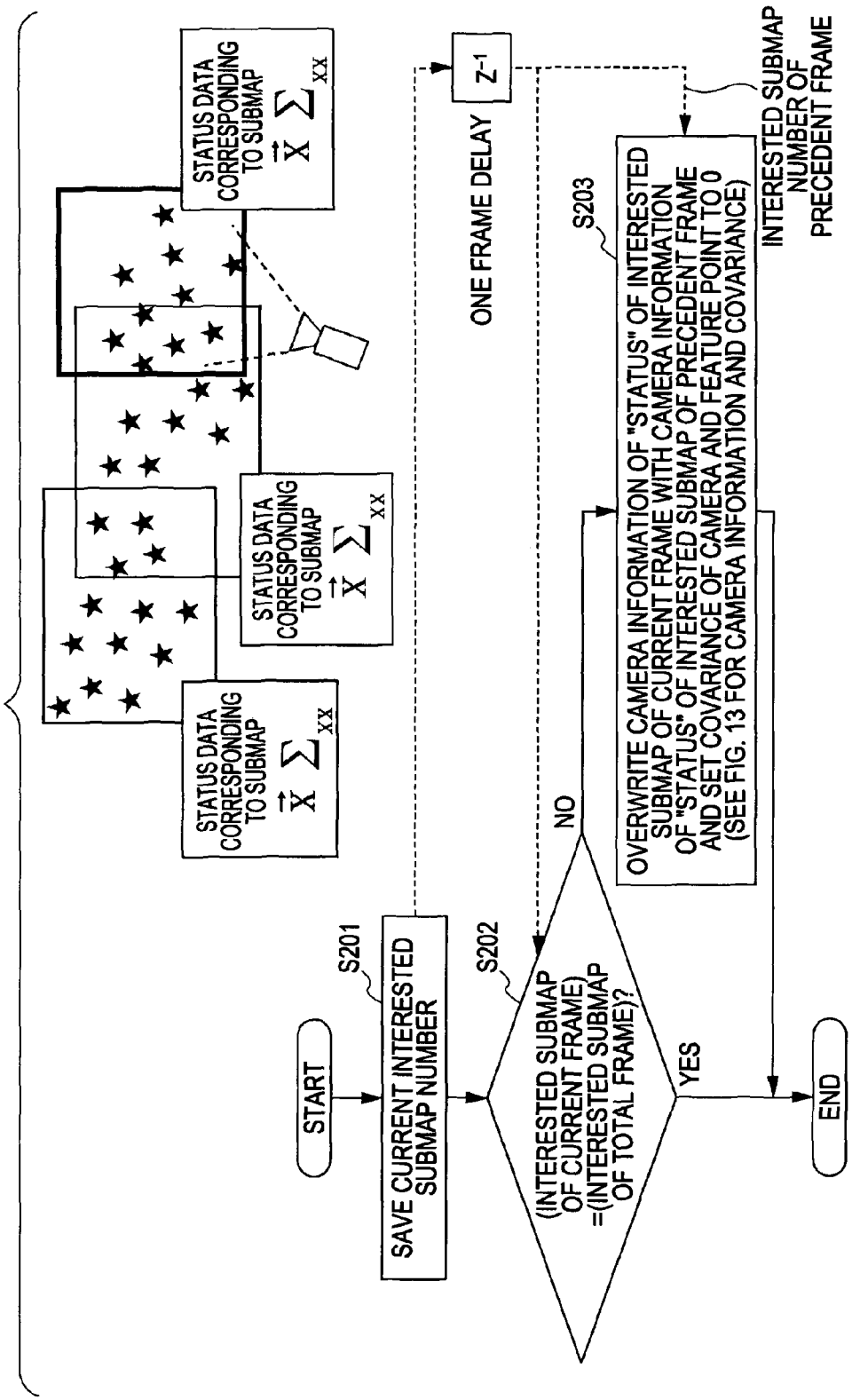

FIG. 13

STATUS REPRESENTATION: MULTIDIMENSIONAL NORMAL DISTRIBUTION (a) MEAN VECTOR $$\vec{x} = \begin{bmatrix} x \\ \omega \\ \dot{x} \\ \dot{\omega} \\ P_1 \\ \vdots \\ P_N \end{bmatrix} \begin{matrix} \text{CAMERA POSITION} \\ \text{CAMERA ATTITUDE} \\ \text{CAMERA SPEED} \\ \text{CAMERA ANGULAR SPEED} \\ \text{POSITION OF FEATURE POINT \#1} \\ \vdots \\ \text{POSITION OF FEATURE POINT \#N} \end{matrix}$$

(b) VARIANCE-COVARIANCE MATRIX $$\Sigma_{xx} = \begin{bmatrix} \sigma_{xx} & \cdots & \sigma_{x\dot{\omega}} & \sigma_{xP_1} & \cdots & \sigma_{xP_N} \\ \vdots & \ddots & \vdots & \vdots & \ddots & \vdots \\ \sigma_{\dot{\omega}x} & \cdots & \sigma_{\dot{\omega}\dot{\omega}} & \sigma_{\dot{\omega}P_1} & \cdots & \sigma_{\dot{\omega}P_N} \\ \sigma_{P_1 x} & \cdots & \sigma_{P_1 \dot{\omega}} & \sigma_{P_1 P_1} & \cdots & \sigma_{P_1 P_N} \\ \vdots & \ddots & \vdots & \vdots & \ddots & \vdots \\ \sigma_{P_N x} & \cdots & \sigma_{P_N \dot{\omega}} & \sigma_{P_N P_1} & \cdots & \sigma_{P_N P_N} \end{bmatrix}$$

331, 332, 333

▭ CAMERA INFORMATION

⬚ COVARIANCE OF CAMERA AND FEATURE POINTS

FIG. 19

(a) BEFORE DIVISION $$\Sigma_{XX} = \begin{bmatrix} \sigma_{xx} & \cdots & \sigma_{\dot{\omega}x} & \sigma_{P_1x} & \cdots & \sigma_{P_{i-1}x} & \sigma_{P_ix} & \sigma_{P_{i+1}x} & \cdots & \sigma_{P_Nx} \\ \vdots & \ddots & \vdots & \vdots & \ddots & \vdots & \vdots & \vdots & \ddots & \vdots \\ \sigma_{x\dot{\omega}} & \cdots & \sigma_{\dot{\omega}\dot{\omega}} & \sigma_{P_1\dot{\omega}} & \cdots & \sigma_{P_{i-1}\dot{\omega}} & \sigma_{P_i\dot{\omega}} & \sigma_{P_{i+1}\dot{\omega}} & \cdots & \sigma_{P_N\dot{\omega}} \\ \sigma_{xP_1} & \cdots & \sigma_{\dot{\omega}P_1} & \sigma_{P_1P_1} & \cdots & \sigma_{P_{i-1}P_1} & \sigma_{P_iP_1} & \sigma_{P_{i+1}P_1} & \cdots & \sigma_{P_NP_1} \\ \vdots & \ddots & \vdots & \vdots & \ddots & \vdots & \vdots & \vdots & \ddots & \vdots \\ \sigma_{xP_{i-1}} & \cdots & \sigma_{\dot{\omega}P_{i-1}} & \sigma_{P_1P_{i-1}} & \cdots & \sigma_{P_{i-1}P_{i-1}} & \sigma_{P_iP_{i-1}} & \sigma_{P_{i+1}P_{i-1}} & \cdots & \sigma_{P_NP_{i-1}} \\ \sigma_{xP_i} & \cdots & \sigma_{\dot{\omega}P_i} & \sigma_{P_1P_i} & \cdots & \sigma_{P_{i-1}P_i} & \sigma_{P_iP_i} & \sigma_{P_{i+1}P_i} & \cdots & \sigma_{P_NP_i} \\ \sigma_{xP_{i+1}} & \cdots & \sigma_{\dot{\omega}P_{i+1}} & \sigma_{P_1P_{i+1}} & \cdots & \sigma_{P_{i-1}P_{i+1}} & \sigma_{P_iP_{i+1}} & \sigma_{P_{i+1}P_{i+1}} & \cdots & \sigma_{P_NP_{i+1}} \\ \vdots & \ddots & \vdots & \vdots & \ddots & \vdots & \vdots & \vdots & \ddots & \vdots \\ \sigma_{xP_N} & \cdots & \sigma_{\dot{\omega}P_N} & \sigma_{P_1P_N} & \cdots & \sigma_{P_{i-1}P_N} & \sigma_{P_iP_N} & \sigma_{P_{i+1}P_N} & \cdots & \sigma_{P_NP_N} \end{bmatrix}$$

DELETE FEATURE POINT INFORMATION ABOUT NOT BELONGING TO SUBMAP (b) AFTER DIVISION $$\Sigma_{XX} = \begin{bmatrix} \sigma_{xx} & \cdots & \sigma_{\dot{\omega}x} & \sigma_{P_1x} & \cdots & \sigma_{P_{i-1}x} & \sigma_{P_{i+1}x} & \cdots & \sigma_{P_Nx} \\ \vdots & \ddots & \vdots & \vdots & \ddots & \vdots & \vdots & \ddots & \vdots \\ \sigma_{x\dot{\omega}} & \cdots & \sigma_{\dot{\omega}\dot{\omega}} & \sigma_{P_1\dot{\omega}} & \cdots & \sigma_{P_{i-1}\dot{\omega}} & \sigma_{P_{i+1}\dot{\omega}} & \cdots & \sigma_{P_N\dot{\omega}} \\ \sigma_{xP_1} & \cdots & \sigma_{\dot{\omega}P_1} & \sigma_{P_1P_1} & \cdots & \sigma_{P_{i-1}P_1} & \sigma_{P_{i+1}P_1} & \cdots & \sigma_{P_NP_1} \\ \vdots & \ddots & \vdots & \vdots & \ddots & \vdots & \vdots & \ddots & \vdots \\ \sigma_{xP_{i-1}} & \cdots & \sigma_{\dot{\omega}P_{i-1}} & \sigma_{P_1P_{i-1}} & \cdots & \sigma_{P_{i-1}P_{i-1}} & \sigma_{P_{i+1}P_{i-1}} & \cdots & \sigma_{P_NP_{i-1}} \\ \sigma_{xP_{i+1}} & \cdots & \sigma_{\dot{\omega}P_{i+1}} & \sigma_{P_1P_{i+1}} & \cdots & \sigma_{P_{i-1}P_{i+1}} & \sigma_{P_{i+1}P_{i+1}} & \cdots & \sigma_{P_NP_{i+1}} \\ \vdots & \ddots & \vdots & \vdots & \ddots & \vdots & \vdots & \ddots & \vdots \\ \sigma_{xP_N} & \cdots & \sigma_{\dot{\omega}P_N} & \sigma_{P_1P_N} & \cdots & \sigma_{P_{i-1}P_N} & \sigma_{P_{i+1}P_N} & \cdots & \sigma_{P_NP_N} \end{bmatrix}$$

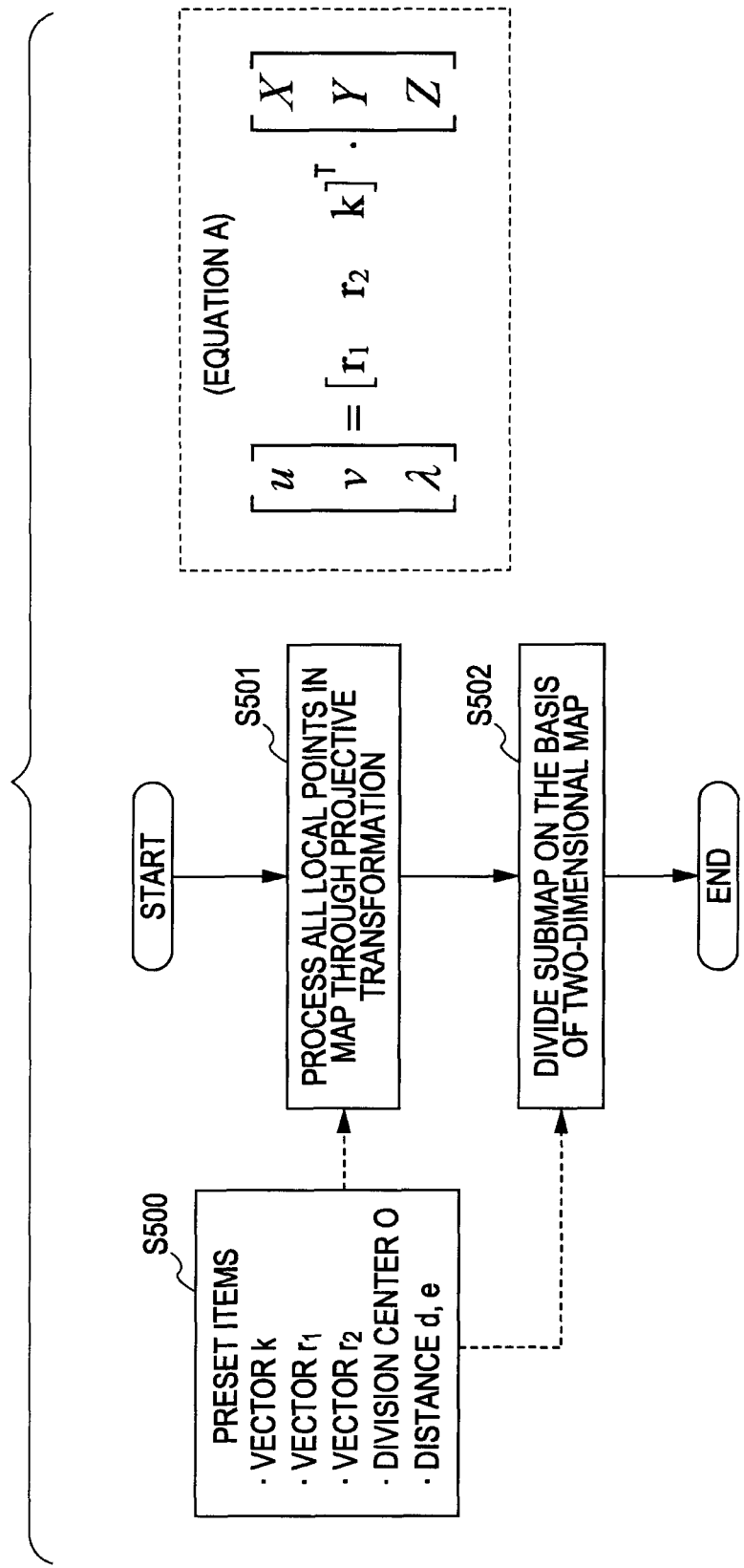

INFORMATION PROCESSING DEVICE, INFORMATION PROCESSING METHOD AND PROGRAM

BACKGROUND OF THE INVENTION

1. Field of the Invention

The present invention relates to an information processing device, an information processing method and a program. More particularly, the invention relates to an information processing device, an information processing method and a program for analyzing a three-dimensional space.

2. Description of the Related Art

In an approach, a three-dimensional space is analyzed by capturing the space with a camera and analyzing the captured image. For example, two or more feature points (also called landmarks) are extracted from the captured image and three-dimensional positions of these feature points are estimated.

In this approach, images are captured with a moving camera and loci of feature points included in two or more captured images are analyzed. Thus, three-dimensional positions of the feature points and position and attitude of the camera (own) are estimated (i.e., localized). A neighborhood map (i.e., an environmental map) can be generated (i.e., mapped) using three-dimensional position information about the feature points. These localization of the camera (own) and mapping of the neighborhood map (i.e., the environmental map) are performed at the same time is called simultaneous localization and mapping (SLAM).

An approach for SLAM includes an EKF-based SLAM which employs an Extended Kalman filter (EKF). The EKF-based SLAM is described in, for example, S. Thrun, W. Burgard and D. Fox, "Probabilistic Robotics" The MIT Press, Cambridge, Mass., 2005).

In the EKF-based SLAM, for example, images are successively captured with a moving camera, loci (i.e., tracking information) of feature points included in each of the images are obtained, and then travel distance of the camera and three-dimensional positions of the feature points are estimated simultaneously by a moving stereo method.

The EKF-based SLAM uses "status data" including multidimensional normal distribution data as a probability distribution model including data like position, attitude, speed and angular speed of a camera, and position information about each of the feature points. The "status data" is updated with the Kalman filter or the Extended Kalman filter in order to estimate positions of the feature points and the camera.

The "status data" is constituted by multidimensional normal distribution data which includes a mean vector and a variance-covariance matrix. The mean vector represents position, attitude, speed and angular speed of a camera and position information about each of the feature points. The variance-covariance matrix includes variance of inherent status values, such as position, attitude, speed and angular speed of a camera, and position information about each of the feature points, and covariance which corresponds to combinations of correlation information of different status values from among the status values mentioned above. The data structure will be described in detail with reference to embodiments of the invention.

In the EKF-based SLAM, "status data" is updated using images captured with a camera. Thus, information about the feature points registered in the "status data" but not included in the most recently captured image which is input as an image to be processed is also updated. That is, some feature points included in a preceding input image are not included in the most recently input image. Information about the feature points included in a preceding input image is registered in the "status data." Thus, information regarding correlation between a "feature point caught by the camera" included in the "status data" and a "feature point not caught by the camera" is also updated with the Kalman filter.

This indicates that a larger area for which a map is to be generated involves a greater number of feature points. If the "status data" includes a large amount of feature point information, updating of the "status data" using the Kalman filter or the Extended Kalman filter involves an increased calculation amount.

As described above, the "status data" includes a variance-covariance matrix, which holds information regarding correlation between each of the feature points and the camera. An increased number of feature points involve an increased size of variance-covariance matrix. A calculation amount in updating the "status data" using the Kalman filter or the Extended Kalman filter increases in an order of $O(9n^2)$ with respect to the number n of the feature points. Since data should be updated repeatedly, there is a problem that calculation load and processing time increase excessively for generating a large-sized three-dimensional map with a large number of feature points.

SUMMARY OF THE INVENTION

It is therefore desirable to provide an information processing device, an information processing method and a program which, in a configuration to estimate positions of feature point positions through analysis of captured images, reduces processing load, predicts three-dimensional positions of the feature points without any decrease in accuracy and generates a three-dimensional map.

A first embodiment of the invention is an information processing device, including: a three-dimensional information generating section for obtaining position and attitude of a camera or three-dimensional positions of feature points by successively receiving images from two or more different viewpoints captured with the camera which moves in a space, and updating status data using observation information which includes tracking information of the feature points, the status data including three-dimensional positions of the feature points within the images and position and attitude information of the camera; and a submap generating section for generating submaps by dividing an area for which the three-dimensional position is to be calculated, wherein the three-dimensional information generating section obtains the position and attitude of the camera or the three-dimensional positions of the feature points by generating status data corresponding to the submaps which do not include information about feature points outside of a submap area for each of the submaps generated by the submap generating section and updating the generated status data corresponding to the submaps.

In an information processing device according to an embodiment of the invention, the three-dimensional information generating section generates, as the status data corresponding to the submaps, multidimensional normal distribution data which includes a mean vector representing the position and attitude of the camera and positions of each of the feature points in the submaps, and a variance-covariance matrix in correspondence with each of the submaps, and updates the multidimensional normal distribution data corresponding to the submaps using the observation information.

In an information processing device according to an embodiment of the invention, the variance-covariance matrix includes variance of inherent status values, such as position and attitude of a camera, and position information about each of the feature points, and covariance which corresponds to combinations of correlation information of different status values from among the status values.

In an information processing device according to an embodiment of the invention, the three-dimensional information generating section updates the status data corresponding to the submaps using a Kalman filter or an Extended Kalman filter (EKF).

In an information processing device according to an embodiment of the invention, if the submaps are to be processed sequentially from a preceding submap to a current submap, the three-dimensional information generating section generates status data corresponding to the current submap directly using camera information included in status data corresponding to the preceding submap.

In an information processing device according to an embodiment of the invention, when the number of feature points included in a submap reaches a predetermined upper limit number N or greater, the submap generating section divides the submap into two with an overlapping area formed therebetween, the two submaps having at least one feature point in common.

In an information processing device according to an embodiment of the invention, the three-dimensional information generating section generates status data corresponding to each of the submaps generated by dividing the submap, and generates status data corresponding to each of the two divided submaps by deleting information about feature points which are not included in each of the divided submaps from among the status data corresponding to the submaps which are not yet divided.

In an information processing device according to an embodiment of the invention, the submap generating section divides a two-dimensional plane generated through projective transformation of an area for which a three-dimensional position is to be calculated into two or more submaps of a predetermined size which have overlapping areas therebetween.

In an information processing device according to an embodiment of the invention, the three-dimensional information generating section corrects positions of the feature points through bundle adjustment.

In an information processing device according to an embodiment of the invention, the three-dimensional information generating section executes simultaneous localization and mapping (SLAM) in which localization of a camera and mapping of a neighborhood map (i.e., an environmental map) are performed at the same time.

A second embodiment of the invention is an information processing method executed in an information processing device, the method including the steps of: generating, by a submap generating section, submaps by dividing an area for which the three-dimensional position is to be calculated; and generating three-dimensional information by a three-dimensional information generating section which obtains position and attitude of a camera or three-dimensional positions of feature points by successively receiving images from two or more different viewpoints captured with the camera which moves in a space, and updating status data using observation information which includes tracking information of the feature points, the status data including three-dimensional positions of the feature points within the images and position and attitude information of the camera, wherein the step of generating three-dimensional information is to obtain the position and attitude of the camera or the three-dimensional positions of the feature points by generating status data corresponding to the submaps which do not include information about feature points outside of a submap area for each of the submaps generated by the submap generating section and updating the generated status data corresponding to the submaps.

A third embodiment of the invention is a program which causes an information processing device to process information, the program including the steps of: causing a submap generating section to generate submaps by dividing an area for which the three-dimensional position is to be calculated; and causing a three-dimensional information generating section to generate three-dimensional information by obtaining position and attitude of a camera or three-dimensional positions of feature points by successively receiving images from two or more different viewpoints captured with the camera which moves in a space, and updating status data using observation information which includes tracking information of the feature points, the status data including three-dimensional positions of the feature points within the images and position and attitude information of the camera, wherein the step of generating three-dimensional information is to obtain the position and attitude of the camera or the three-dimensional positions of the feature points by generating status data corresponding to the submaps which do not include information about feature points outside of a submap area for each of the submaps generated by the submap generating section and updating the generated status data corresponding to the submaps.

The program of the invention can be provided by a storage medium and a communication medium that provide image processing devices and computer systems with various computer-readable program codes. With these computer-readable programs, the image processing devices and the computer systems execute processes in accordance with the programs.

Other objects, characteristics and advantages of the invention will become apparent to those skilled in the art from the following detailed description of the invention and the accompanying drawings. The term "system" used herein describes a logical collective configuration of plural devices, which are not necessarily in a single housing.

An embodiment of the invention provides a configuration to reduce a calculation amount and efficiently generate three-dimensional position information. In the SLAM process, i.e., a process for obtaining three-dimensional positions of feature points using images captured with a camera input as observation data and then updating status data having multidimensional normal distribution data which includes feature point position information, submap(s) are generated by dividing an area for which three-dimensional information is to be generated. Then, status data corresponding to a submap which does not include data about the feature points not belonging to the submap is generated and updated on the basis of observation data. This configuration can reduce volume of the status data and a calculation amount involved in updating the status data, thereby achieving efficient processing.

BRIEF DESCRIPTION OF THE DRAWINGS

FIG. 2 illustrates a configuration of status data used in SLAM;

FIG. 12 is a flowchart of a process for preparing "status data" for the interested submap in step S102 in the flowchart of FIG. 10;

FIG. 13 illustrates status data corresponding to a submap;

FIG. 19 illustrates an exemplary process for status data corresponding to a submap in steps S455 and S456 in the flowchart of FIG. 15;

FIG. 20 is a detailed flowchart of a sequence for spatially dividing an interested submap through projection approximation of a three-dimensional map onto a two-dimensional map into regular intervals on the two-dimensional map;

DESCRIPTION OF THE PREFERRED EMBODIMENTS

Figure 1:
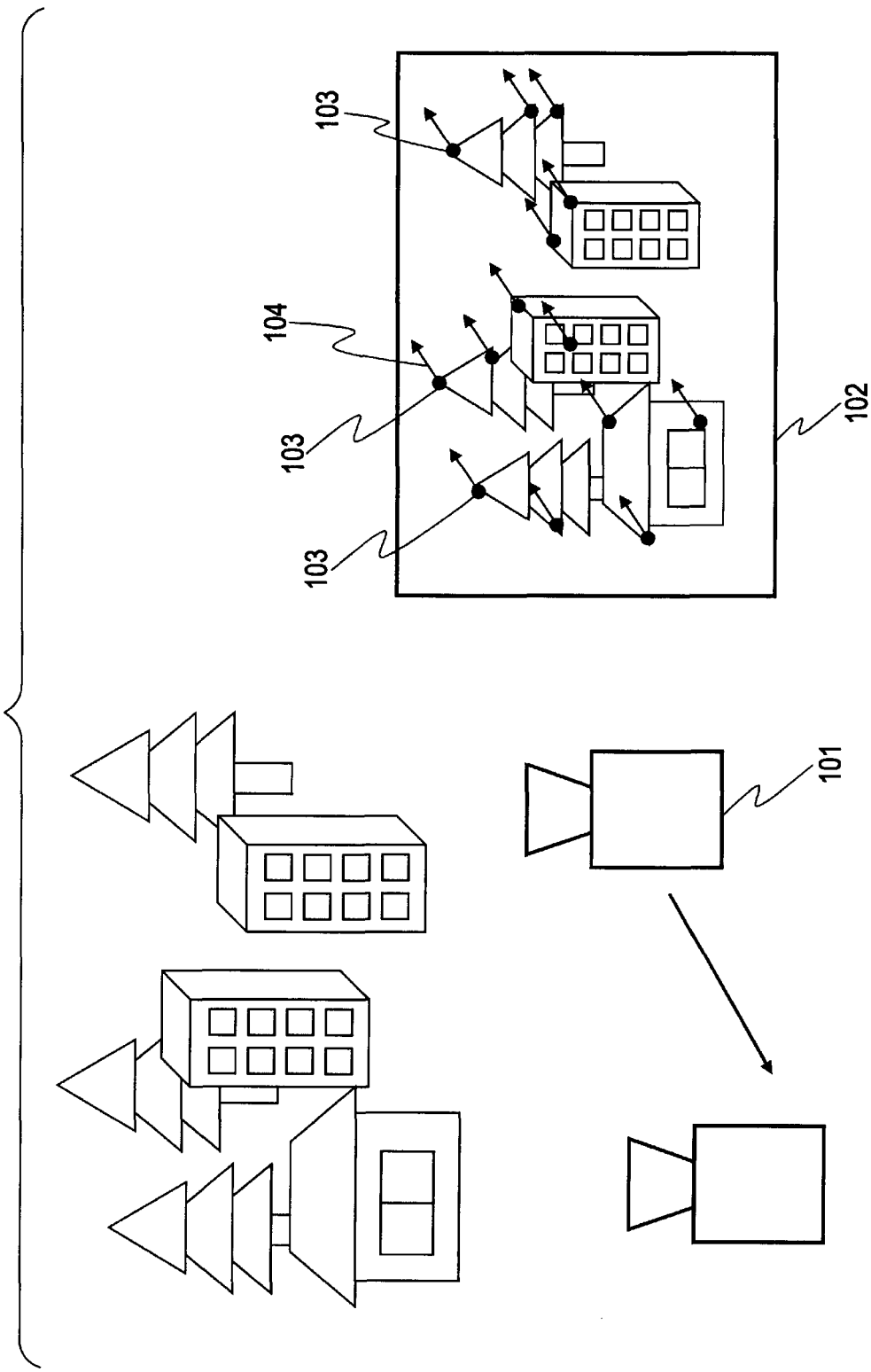
FIG. 1 schematically illustrates a simultaneous localization and mapping (SLAM) process.

Hereinafter, an information processing device, an information processing method and a program according to embodiments of the invention will be described with reference to the drawings. Description will be given in the following order.

1. Outline of SLAM Process
2. Submap
3. Exemplary Configuration of Information Processing Device and Exemplary Process using Submap(s)
4. Additional Approach to Generate Submap(s)

1. Outline of SLAM Process

The information processing device according to an embodiment of the invention estimates three-dimensional positions of feature points on the basis of feature point information included in an image captured with a camera. The prediction is made through, for example, simultaneous localization and mapping (SLAM) in which a position of a camera is identified (i.e., localized) and a neighborhood map is generated (i.e., mapped) at the same time.

In particular, the information processing device successively captures images while moving the camera and obtains loci (i.e., tracking information) of feature points included in the captured images. The information processing device then estimates travel distance of the camera and three-dimensional positions of the feature points at the same time in a mobile stereo process.

As described above, an approach for SLAM includes SLAM which employs a Kalman filter and EKF-based SLAM which employs an Extended Kalman filter (EKF). The SLAM will be described with reference to FIG. 1 and other drawings. In a system illustrated in FIG. 1, images captured with a monocular camera 101 are input and analyzed. The camera 101 successively captures images while moving. In SLAM, tracks of the feature points in the images are detected and travel distance of the camera and three-dimensional positions of the feature points are estimated at the same time in a mobile stereo process on the basis of travel distance (i.e., tracking result) of the feature points.

Status data illustrated in FIG. 2 is used in SLAM. In particular, travel distance of the camera 101 illustrated in FIG. 1 and positions of feature points 103 included in the images captured by the camera 101 are estimated on the basis of the "status data" represented as multidimensional normal distribution.

The "status data" is constituted by multidimensional normal distribution data of status values which represents a status of the camera for capturing the images and the feature points as illustrated in FIG. 2. In particular, the "status data" is constituted by multidimensional normal distribution data which includes a mean vector and a variance-covariance matrix. The mean vector represents status values, such as position, attitude, speed and angular speed of a camera and position information of each of feature points (P1 to PN). The variance-covariance matrix includes variance ($\sigma_{aa}$) of inherent status values, such as position, attitude, speed and angular speed of a camera, and position information about each of the feature points, and covariance ($\sigma_{ab}$) which corresponds to combinations of correlation information of different status values from among the status values mentioned above.

The camera captures images while moving and successively obtains feature point tracking information (loci) from the captured images. The status data is updated using a Kalman filter or an Extended Kalman filter (EKF) to identify the position (i.e., localize) of the camera and generate (i.e., map) a neighborhood map (i.e., an environmental map). A monocular camera is suited for a pinhole camera model and it is assumed that all the feature points are fixed.

Figure 3:
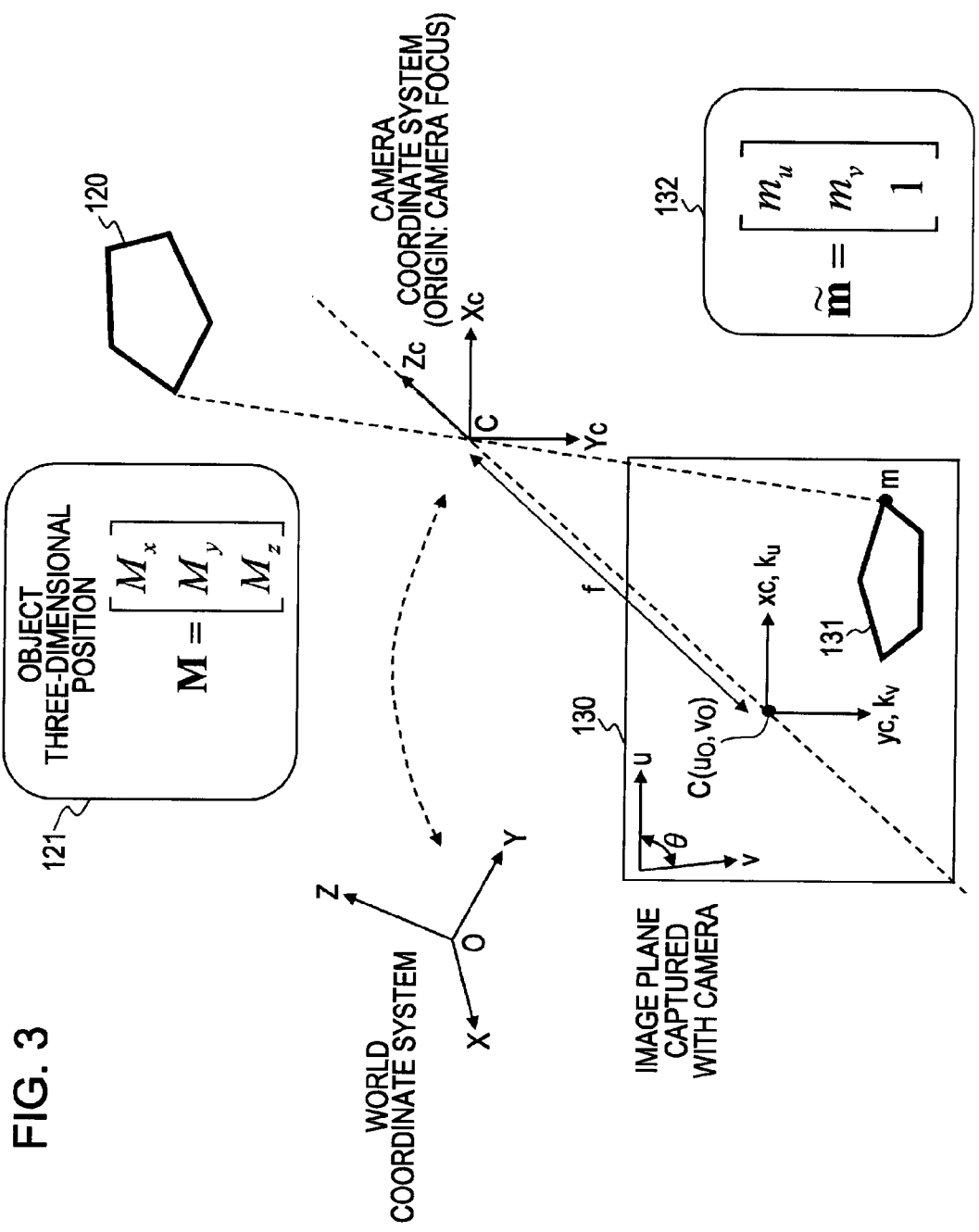
FIG. 3 illustrates a pinhole camera model.

The pinhole camera model will be described with reference to FIGS. 3 and 4. With the pinhole camera model, positions of the feature points in an image frame can be calculated with the following Equation 1.

$$\lambda \tilde{m} = AR_w(M - C_w) \qquad \text{(Equation 1)}$$

Equation 1 will be described with reference to FIGS. 3 and 4. Equation 1 shows correlation between a pixel position 132 on an image plane captured with a camera corresponding to a point (m) of an object 131 in the captured image 130, i.e., a position represented by a camera coordinate system, and a three-dimensional position (M) 121 of an object 120 in a world coordinate system.

The pixel position 132 on the image plane captured with a camera is represented by the camera coordinate system. The camera coordinate system has two-dimensional planes Xc and Yc and depth Zc with a focus of the camera as an origin C. The origin C is moved as the camera moves.

The three-dimensional position (M) 121 of the object 120 is represented by a three-axis world coordinate system having three axes X, Y and Z with an origin O which is fixed regardless of movement of the camera. An equation which represents correlation between positions of the object in different coordinate systems is defined as a pinhole camera model.

Figure 4:
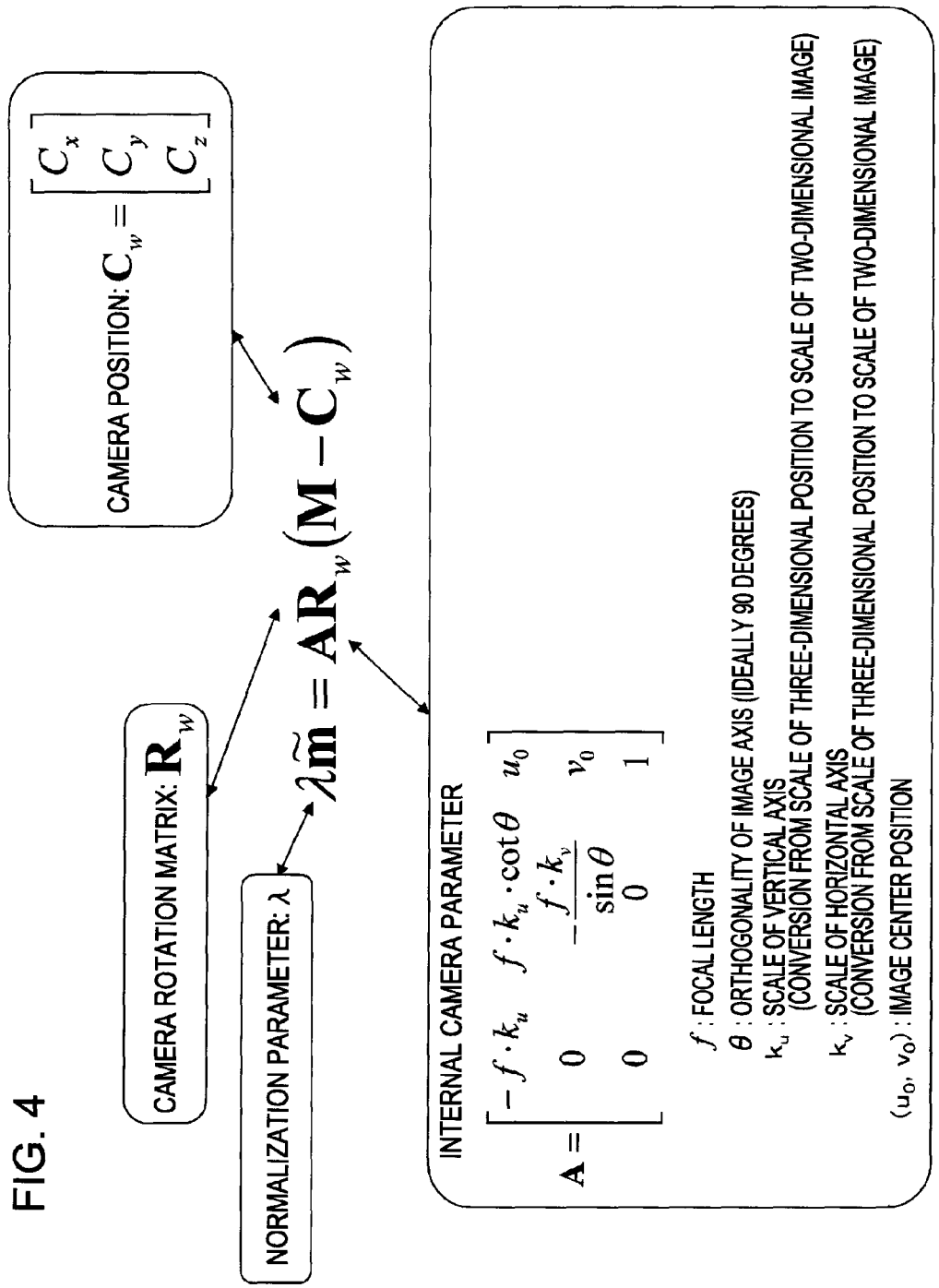
FIG. 4 illustrates a pinhole camera model.

As illustrated in FIG. 4, in Equation 1, λ represents a normalization parameter, A represents an internal camera parameter, Cw represents a camera position and Rw represents a camera rotation matrix.

The following equation represents a position of the camera on an image plane represented by a homogeneous coordinate system.

$$\tilde{m} = \begin{bmatrix} m_u \\ m_v \\ 1 \end{bmatrix}$$

Lambda represents a normalization parameter which is defined to satisfy a third term of the following equation.

$$\tilde{m}$$

The internal camera parameter A includes the following values: f: focal length; theta: orthogonality of image axes (ideally 90 degrees); $k_u$: a scale of a vertical axis (conversion from a scale of a three-dimensional position to a scale of a two-dimensional image); $k_v$: a scale of a horizontal axis (conversion from a scale of a three-dimensional position to a scale of a two-dimensional image); and ($u_0$, $v_0$) : an image center position.

The feature point in the world coordinate system is represented by a position M. The camera is represented by a position Cw and attitude (i.e., a rotation matrix) Rw. A focal position of the camera and an image center are represented by an internal camera parameter A. With these parameters, relationships between positions of the "feature points in the world coordinate system" projected on the "image plane of the camera" can be represented by Equation 1.

If the position and attitude of the camera are represented by the rotation matrix Rw and a translation vector tw, the following Equation 2 is satisfied. A relationship between the translation vector tw and the camera position is represented by Equation 3.

$$\lambda \tilde{m} = A R_w M + t_w \quad \text{(Equation 2)}$$

$$t_w = -R_w \cdot C_w \quad \text{(Equation 3)}$$

The monocular camera 101 in the system illustrated in FIG. 1 is suited for such a pinhole camera model. The camera captures images while moving and successively obtains feature point tracking information (loci) from the captured images. The status data is updated using a Kalman filter or an Extended Kalman filter to identify the position (i.e., localize) of the camera and generate (i.e., map) a neighborhood map (i.e., an environmental map).

The Kalman filter and the Extended Kalman filter will be described. The Kalman filter is a sequential estimation (prediction) filter with which frames constituting images captured with a camera are successively input and a current status (i.e., an estimated value) is obtained for a to-be-processed frame on the basis of a status (i.e., an estimated value) of a precedent frame and an observed value (i.e., a result of feature point tracking) obtained from the current frame. The "status" corresponds to status data represented by the multidimensional normal distribution model constituted by (a) a mean vector and (b) a variance-covariance matrix illustrated in FIG. 2.

Equations regarding the Kalman filter are shown below.
Predictive Models:

$\hat{x}_t = F_t x_{t-1}$ (Calculation of a mean vector of a predicted "status")

$\hat{S}_{xx,t} = F_t S_{xx,t-1} F_t^T + Q_t$ (Calculation of a variance-covariance matrix of an predicted "status")

Observation Models:

$\hat{z}_t = H_t \hat{x}_t$ (Calculation of an estimated value $\hat{z}$ of observation)

$v_t = z_t - \hat{z}_t$ (Calculation of mean vector of difference between the estimated value $x$ and an actual observation value $z$)

$S_{vv,t} = H_t \hat{S}_{xx,t} H_t^T + R_t$ (Calculation of a variance-covariance matrix of difference $V_t$)

$K_t = \hat{S}_{xx,t} H_t^T S_{vv,t}^{-1}$ (Calculation of Karman gain)

$x_t = \hat{x}_t + K_t v_t$ (Update of "status")

$S_{xx,t} = (I - K_t H_t) \hat{S}_{xx,t}$ (Update of a variance-covariance matrix of "status", in which $I$ represents a unit matrix)

In the above Equations, Ft represents an predictive model (matrix) and Ht represents an observation model (matrix). The Equations represent an predictive model error in accordance with a multidimensional normal distribution model with an average of 0 and variance-covariance Qt and an observation model error in accordance with a multidimensional normal distribution model with an average of 0 and variance-covariance Rt.

^ represents a predictive value. Each model can be set in a manner described in, for example, http://en.wikipedia.org/wiki/Kalman_filter#Examples.

Since Ft and Ht are matrices, the Kalman filter is limited to a linear model. To address this problem, the Extended Kalman filter (EKF) was developed. The EKF can be applied to a non-linear predictive model and an observation model. Equations regarding the EKF are shown below.
Predictive Models:

$\hat{x}_t = F_t(x_{t-1})$ (Calculation of a mean vector of a estimated "status")

$\hat{S}_{xx,t} = (\nabla F(X_{t-1})) \cdot S_{xx,t-1} \cdot (\nabla F(x_{t-1}))^T + Q_t$ (Calculation of a variance-covariance matrix of an estimated "status")

Observation Models:

$\hat{z}_t = H(\hat{x}_t)$ (Calculation of an estimated value $\hat{z}$ of observation)

$v_t = z_t - \hat{z}_t$ (Calculation of difference $v$ between the estimated value $x$ and an observation value $z$)

$S_{vv,t} = (\nabla H(\hat{x}_t))\hat{S}_{xx,t}(\nabla H(\hat{x}_t))^T + R_t$ (Calculation of a variance-covariance matrix of difference $V_t$)

$K_t = \hat{S}_{xx,t}(\nabla H(\hat{x}_t))^T S_{vv,t}^{-1}$ (Calculation of Karman gain)

$x_t = \hat{x}_t + K_t v_t$ (Update of "status")

$S_{xx,t} = (I - K_t(\nabla H(\hat{x}_t)))\hat{S}_{xx,t}$ (Update of a variance-covariance matrix of "status", in which $I$ represents a unit matrix)

In the above Equations, F represents a predictive model function, H represents an observation model function, ($\nabla F(x)$) represents a Jacobian matrix of the function F, ($\nabla H(x)$) represents a Jacobian matrix of the function H, Qt represents a predictive model error (in accordance with a multidimensional normal distribution model with an average of 0 and variance-covariance of Qt) and Rt represents an observation model error (in accordance with a multidimensional normal distribution model with an average of 0 and variance-covariance of Rt).

The camera 101 illustrated in FIG. 1 captures images while moving and successively obtains feature point tracking information (loci) from the captured images. The status data is updated using a Kalman filter or an Extended Kalman filter to identify the position (i.e., localize) of the camera and generate (i.e., map) a neighborhood map (i.e., an environmental map).

As described above with reference to FIG. 2, travel distance of the camera 101 illustrated in FIG. 1 and positions of feature points 103 included in the image captured with the camera 101 are estimated on the basis of "status data" represented by multidimensional normal distribution illustrated in FIG. 2.

The "status data" is constituted by multidimensional normal distribution data of status values which represents a status of the camera for capturing the images and the feature points as illustrated in FIG. 2. In particular, the "status data" is constituted by multidimensional normal distribution data which includes a mean vector and a variance-covariance matrix. The mean vector represents status values, such as position, attitude, speed and angular speed of a camera and position information of each of feature points (P1 to PN). As illustrated in FIG. 5A, the variance-covariance matrix includes variance of inherent status values, such as position, attitude, speed and angular speed of a camera, and position information about each of the feature points, and covariance which corresponds to combinations of correlation information of different status values from among the status values mentioned above.

Figure 5:
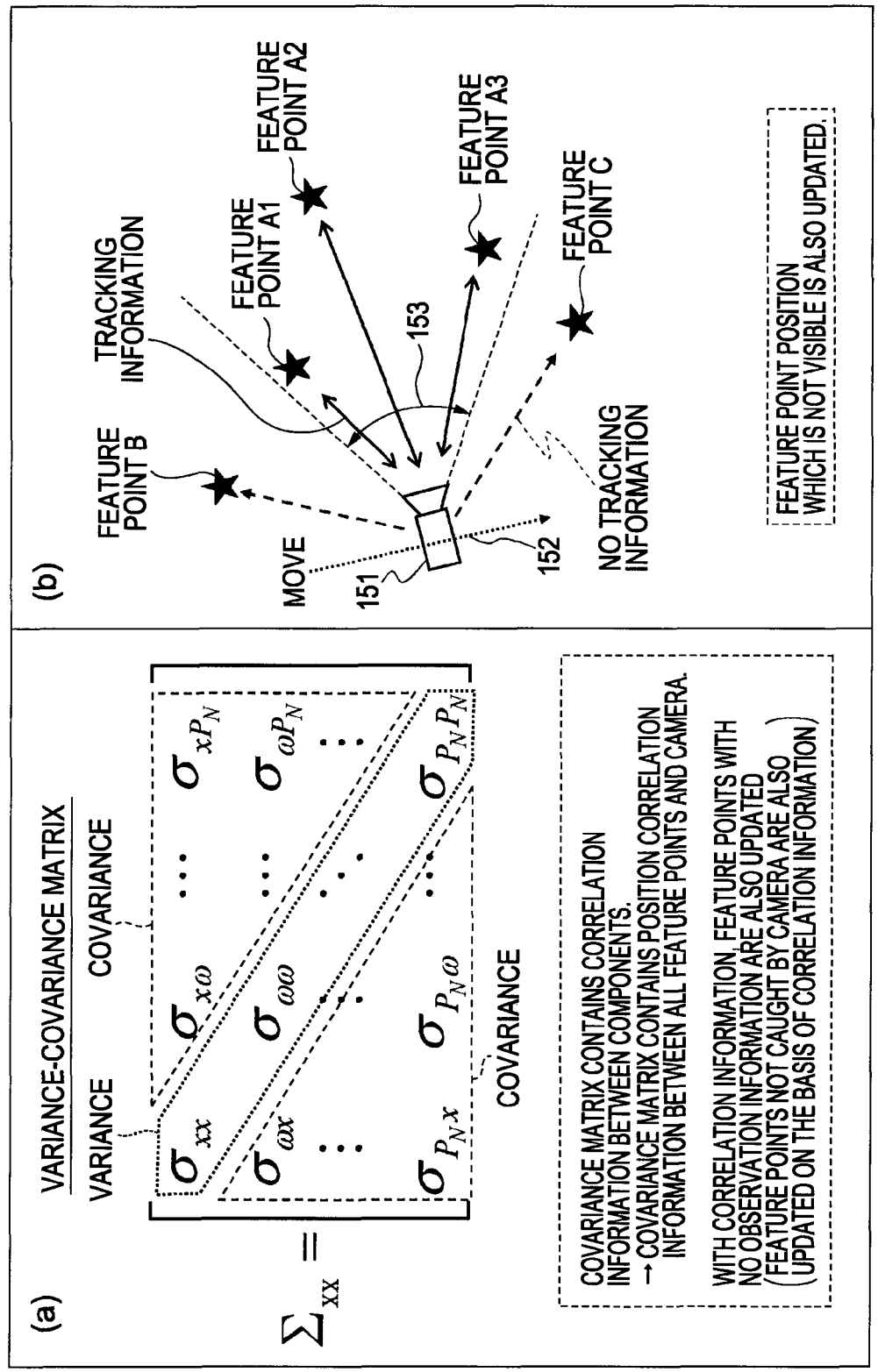
FIG. 5 illustrates a configuration of status data used in SLAM.

Positions of the feature points #1 to #N are represented as P1 to PN in the status data illustrated in FIGS. 2 and 5. Covariance data about P1 to PN which are the positions of the feature points #1 to #N is included in the variance-covariance matrix as a factor.

Since the camera successively captures images while moving, the feature points included in the captured images successively appear and disappear. This means that the feature points #1 to #N are not necessarily included in all the frames. Thus, some feature points are included in an image frame F1 but not in a subsequent image frame F2 while other feature points are included in the image frame F2 but not in the preceding image frame F1.

As illustrated in FIG. 5B, since a camera 151 successively captures images while moving along a moving line 152, the feature points included in the captured images successively appear and disappear. For example, when an image captured at the time to is an image within an image capturing range 153, feature points A1 to A3 are included in the captured image. Feature points B and C are not included in the captured image but are included in the preceding or subsequent image.

In the related art EKF-based SLAM, "status data" including all the information about the feature points obtained at the time of the processing is used. In SLAM, for example, using images of frames f01 to fnn, status data including all the feature points detected in the frames f01 to fnn are generated and updated.

Accordingly, some feature points are registered in status data to be updated using the Kalman filter and the EKF but not included in an image frame input as an observation value. In this case, feature point information which is not included in the input image frame as an observation value included in the status data is also updated. The status data is updated using the Kalman filter and the EKF on the basis of correlation information between the "feature points captured with the camera" which is covariance data included in the status data and "feature points which is not captured with the camera."

It is therefore necessary in SLAM to update data involving multiple pieces of feature point information and the status data is updated using position information of the feature points which is not obtained from the current image. Such an updating process increases calculation cost and leads to inefficient processing.

An example will be given in which the feature points included in the currently captured image, i.e., "positions of feature points appearing in the image" are correct (i.e., an estimated value corresponds to an actual value) while the feature points included in the currently captured image, i.e., "position and attitude of the camera and positions of the feature points not appearing in the image" are not correct. In a model with no correlation information included in the "status data" (i.e., all covariance components of the variance-covariance matrix are 0), only the camera position is updated. In a model with correlation information included in the "status data" (i.e., not all covariance components of the variance-covariance matrix are 0), positions of the feature points not appearing in the image are also updated in accordance with the degree of updating of the camera position and attitude and correlation information.

Since the variance-covariance matrix keeps correlation information between all the feature points and cameras, the larger the number of feature points, the larger the size of the variance-covariance matrix. A calculation amount increases in an order of O ($9n^2$) with respect to the number of the feature points. Increase in the size of the variance-covariance matrix is a greater problem especially for real time processing. It is therefore a problem that if a large amount of feature point information is included in the status data, processing time and processing load increase.

2. Submap

Figure 6:
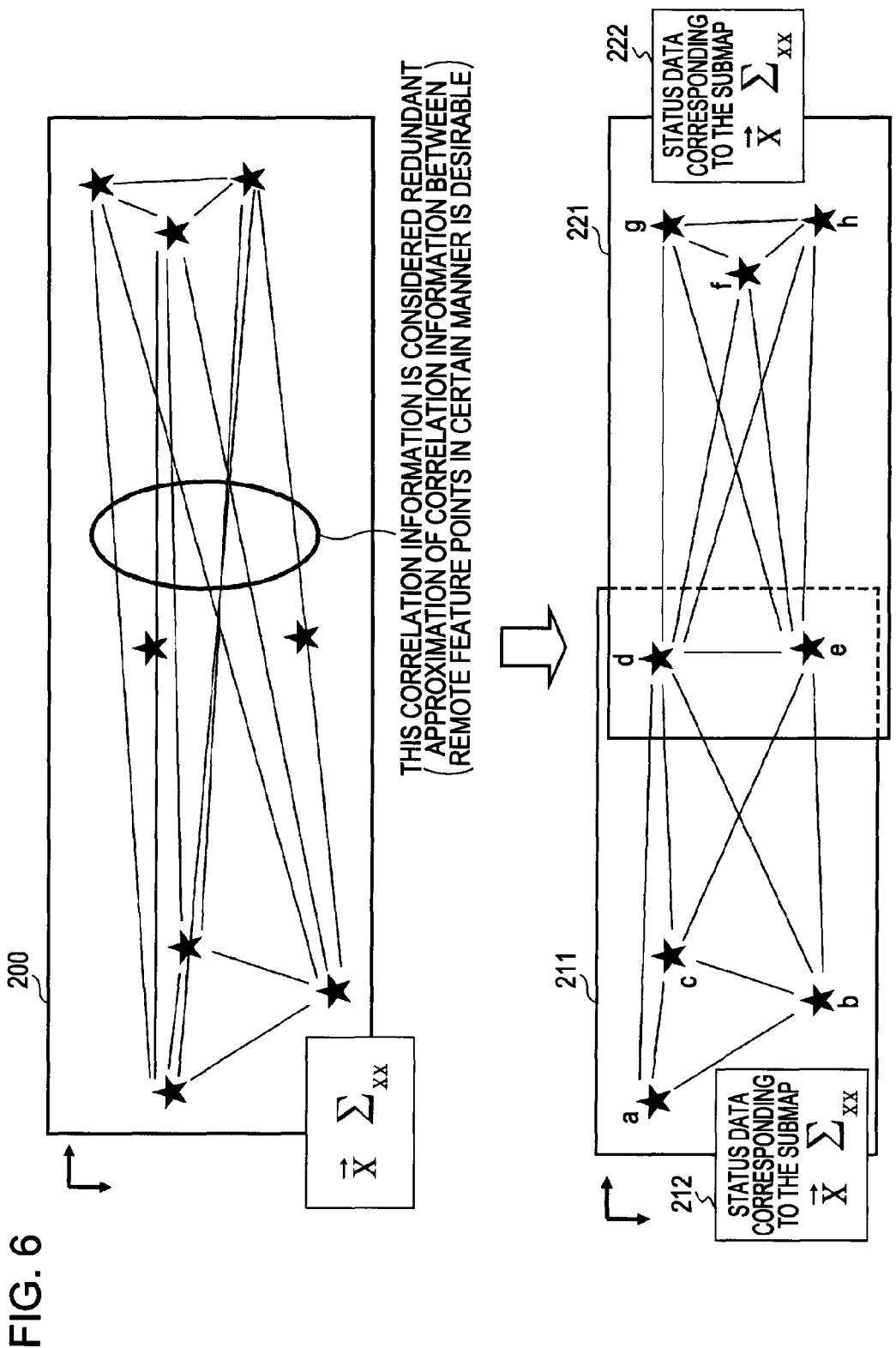
FIG. 6 illustrates submaps and status data used in a process of an information processing device according to an embodiment of the invention.

In order to address these problems, a map 200 representing an entire area to be analyzed in regard to the three-dimensional position as illustrated in FIG. 6 is divided into submaps 211 and 221 in the invention. Each submap is correlated with (a) an identification number (ID) of the submap and (b) status data used in calculation of SLAM.

In the present embodiment, M1, M2 and . . . are used as identifiers (IDs) of the submaps. For example, submaps M1 211 and M2 221 are illustrated in a lower half of FIG. 6. Status data 212 and 222 corresponding to the submaps are similar to those described with reference to FIG. 2 and are constituted by multidimensional normal distribution data of status values representing statuses of the camera which captures images and feature points. In particular, the "status data" is constituted by multidimensional normal distribution data which includes a mean vector and a variance-covariance matrix. The mean vector represents status values, such as position, attitude, speed and angular speed of a camera and position information of each of feature points (P1 to PN). The variance-covariance matrix includes variance ($\sigma_{aa}$) of inherent status values, such as position, attitude, speed and angular speed of a camera, and position information about each of the feature points, and covariance ($\sigma_{ab}$) which corresponds to combinations of correlation information of different status values from among the status values mentioned above.

Note that the feature point information included in the status data corresponding to a particular submap is only the information about the feature points included in that submap. This means that the status data 212 corresponding to the submap M1 211 illustrated in FIG. 6 is constituted by multi-dimensional normal distribution data which includes a mean vector and a variance-covariance matrix. The mean vector represents position, attitude, speed and angular speed of a camera, position information about the feature points a, b, c, d and e in the submap M1 211, and status values thereof.

The status data 222 corresponding to the submap M2 221 is constituted by multidimensional normal distribution data which includes a mean vector and a variance-covariance matrix. The mean vector represents position, attitude, speed and angular speed of a camera, position information about the feature points d, e, f, g and h in the submap M2 221, and status values thereof.

Status data corresponding to each submap does not include the following data: correlation information, i.e., covariance data, between feature points included only in its own submap and those included only in different submap(s); and a mean vector and variance-covariance data with regard to feature points not included in its own submap.

For example, correlation information, i.e., the covariance data, between the feature points (a, b, c) included only in the submap M1 211 and the feature points (f, g, h) included only in the submap M2 221 are not included in the status data 212 of the submap M1 211. Similarly, correlation information, i.e., the covariance data, between the feature points (f, g, h) included only in the submap M2 221 and the feature points (a, b, c) included only in the submap M1 211 are not included in the status data 222 of the submap M2 221.

All the "status data" 212 and 222 generated in correspondence with each of the submaps 211 and 221 are represented by the world coordinate system. In SLAM, a calculation amount is reduced by processing only the "status data" corresponding to a particular submap, e.g., by updating the status data using the Kalman filter and the Extended Kalman filter.

Figure 7:
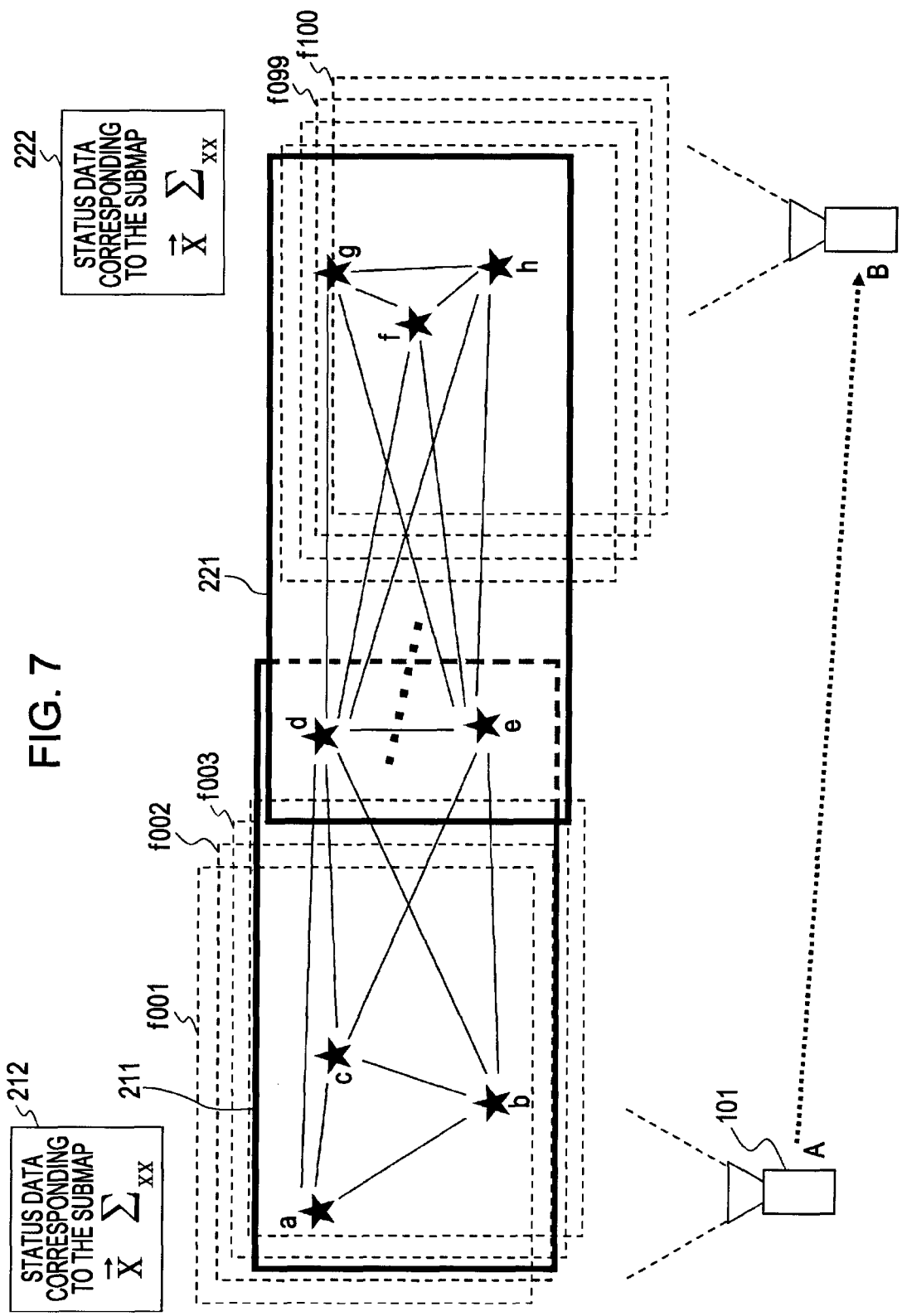
FIG. 7 illustrates correlation between the submaps and image frames used in a process of an information processing device according to an embodiment of the invention.

The submap is an area generated as a unit for execution of SLAM and thus does not correspond to the image frame captured with the camera 101 as illustrated in FIG. 1. Exemplary correlation between the image frame captured with the camera 101 and the submap is illustrated in FIG. 7.

The camera 101 successively captures, for example, 100 frames f001 to f100 while moving from a point A toward a point B. Many feature points are extracted from these many image frames and tracking (loci) data of the feature points is obtained.

The submap M1 211 is an area for SLAM using, for example, 60 image frames f001 to f060. The submap M2 221 is an area for SLAM using, for example, 60 image frames f041 to f100. As described above, the submaps M1, M2, and . . . are areas generated as a unit for execution of SLAM. The number of frames described above is illustrative only and each submap may be constituted by any number of frames.

Figure 8:
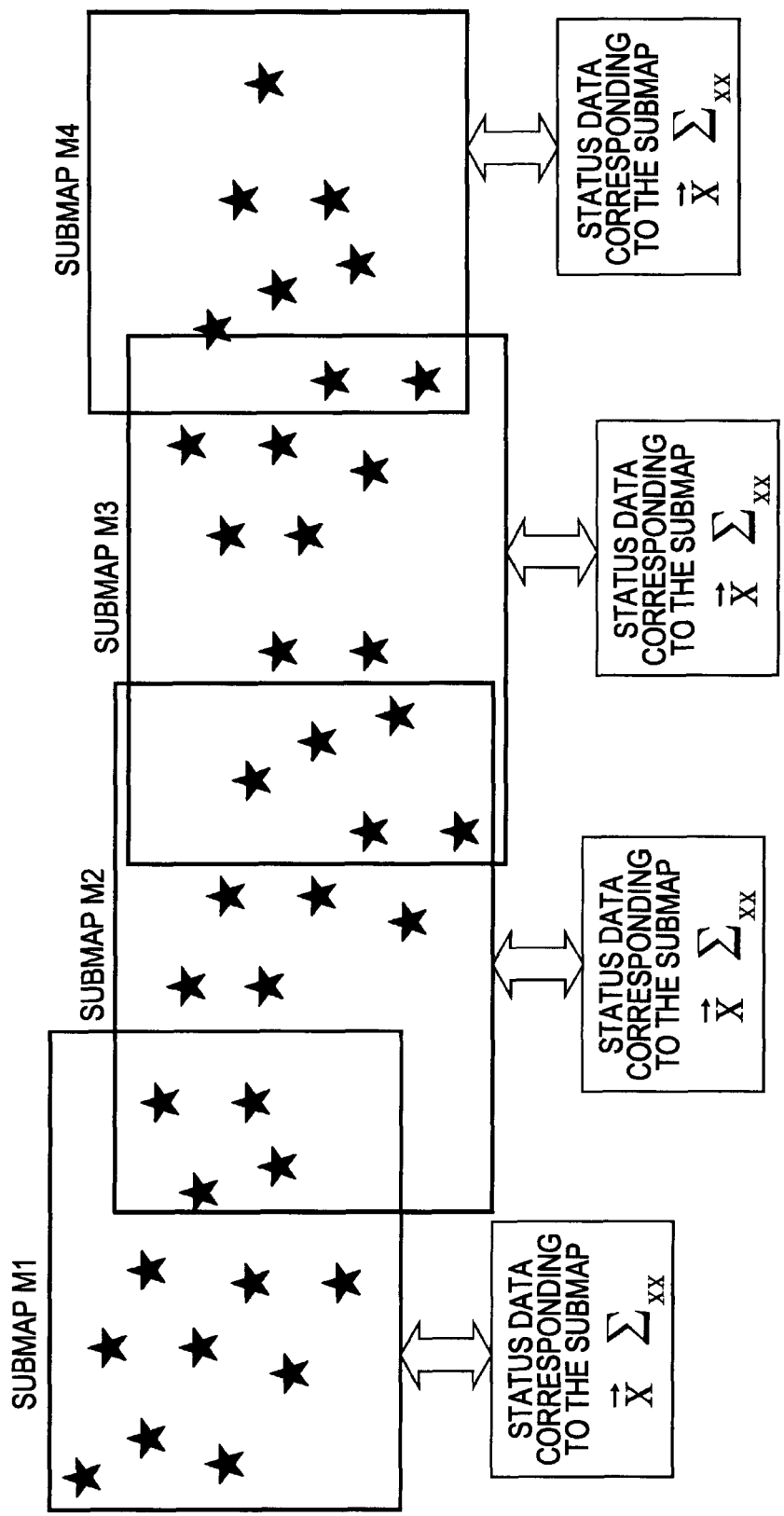
FIG. 8 illustrates submaps and status data used in a process of an information processing device according to an embodiment of the invention.

The submap area is generated on condition that, for example, the number of feature points included in a single submap is not larger than a predetermined upper limit number. Although only two submaps are illustrated in FIGS. 6 and 7, any number of submaps may be generated. Four submaps M1 to M4 are generated in an example of FIG. 8. The submaps are generated to overlap each other as illustrated in FIGS. 6 to 8. The feature points in an overlapping area are represented by a status variable of each submap. This means that those feature points in the overlapping area holds two or more pieces of position information. The two or more feature positions will be optimized later so that the position information will be converged ("total optimization" in the flowchart of FIG. 10). This process will be described in detail later.

3. Exemplary Configuration of Information Processing Device and Exemplary Process Using Submap(s)

Figure 9:
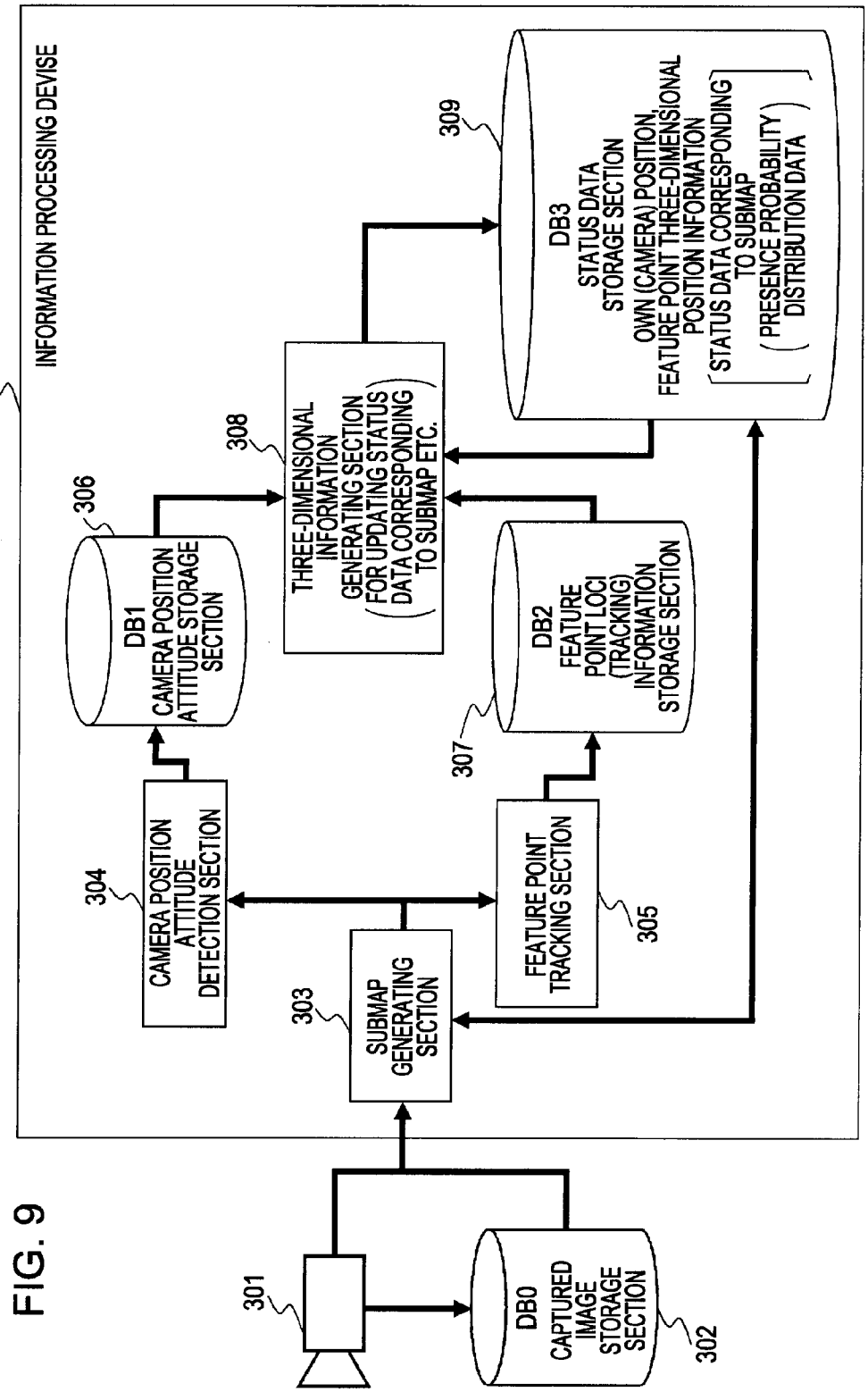
FIG. 9 illustrates an exemplary configuration of an information processing device according to an embodiment of the invention.

Next, an exemplary configuration of the information processing device of the invention and an exemplary process using the submap will be described. FIG. 9 illustrates an exemplary configuration of the information processing device according to the invention. With the information processing device 300 of the invention, feature point tracking information (i.e., loci) is obtained on the basis of the image data captured with the camera 301, the status data is updated using a Kalman filter or an Extended Kalman filter to identify the position (i.e., localize) of the camera and generate (i.e., map) a neighborhood map (i.e., an environmental map). The camera 301 is suited for a pinhole camera model.

As illustrated in FIG. 9, in the information processing device 300 according to an embodiment of the invention, images captured with the camera 301 which captures the ambient environment are input directly into the device 300. Alternatively, captured images stored in a captured image storage section 302 (i.e., a database (DB) 0) are input to the device 300.

A submap generating section 303 divides an area to be processed (i.e., an entire map) for which a three-dimensional map is to be generated into an arbitrary number of submap areas. The area for which the three-dimensional map is to be generated is an area covered with the images captured with the camera 301 as illustrated in FIG. 9. For generation of the three-dimensional map, images captured with the camera 301 may be successively input in real time or may be obtained from the storage section 302.

If the captured images are obtained from the storage section, the area to be processed (i.e., the entire map) for which a three-dimensional map is to be generated can be recognized previously and the recognized entire area can be divided into two or more submap areas. Division may be performed on an arbitrary basis. For example, the entire area may be divided into two to provide initial two submaps. The entire area may be divided into four to provide four submaps. Alternatively, submaps may be generated on the basis of a certain number of captured image frames or the image capturing time. As described above with reference to FIG. 7, a submap may be constituted by an area covered with a predetermined number of image frames, e.g., 60 frames. Alternatively, a submap may be generated on the basis of predetermined camera travel distance.

When the images captured with the camera 301 are successively input in real time, a submap may be constituted by an area covered with a predetermined number of image frames or may be generated on the basis of predetermined camera travel distance.

The submap generating section 303 inputs the images captured with the camera 301 or output from the storage section 302 to generate submaps. Note that a single map may be generated initially and then divided into two or more submaps as the process progresses. For example, the map may be divided into two when the number of feature points in a particular map or submap to be processed reaches a predetermined upper limit or greater. Alternatively, a spatial area of a particular map or submap to be processed reaches a predetermined size or greater. Generation and division of the submaps will be described in detail later.

The information processing device 300 includes a camera position and attitude detecting section 304, a feature point tracking section 305, a camera position and attitude storage section 306, a feature point loci (tracking) information storage section 307, a three-dimensional information generating section 308 and a status data storage section 309. The camera position and attitude detecting section 304 estimates position and attitude of the camera. The camera position and attitude storage section 306 (i.e., a database (DB) 1) stores camera position and attitude information detected by the camera position and attitude detecting section 304.

The feature point tracking section 305 tracks the feature points included in the captured images. The feature point loci (tracking) information storage section 307 (i.e., a database (DB) 2) stores loci information of the feature points detected by the feature point tracking section 305.

The three-dimensional information generating section 308 receives camera position and attitude information stored in the camera position and attitude storage section 306 and the feature point loci information stored in the feature point loci information storage section 305, and calculates position and attitude of the camera and three-dimensional positions of the feature points on the basis of the input information. The status data storage section 309 stores own (i.e., camera) position and status data corresponding to the submap (presence probability distribution data) including the feature point three-dimensional position information.

The camera position and attitude detecting section 304, the feature point tracking section 305 and the three-dimensional information generating section 308 execute their processes on the submap basis generated by the submap generating section 303.

The camera 301 may be mounted on a moving robot or moved manually by a human user. This means that the position and attitude of the camera 301 are not fixed. The camera 301 successively inputs image frames captured at varying positions and attitudes, i.e., from varying viewpoints (e.g., moving images). As described above, the camera 301 is suited for a pinhole camera model.

The camera position and attitude detecting section 304 corrects positions of the feature points and the camera for each frame on the basis of the feature points in the image input from the camera 301. The camera position and attitude detecting section 304 generates camera position (Cw) and a camera rotation matrix (Rw) as estimated position and attitude information of the camera represented by the world coordinate system determined by the camera position and attitude detecting section 304. The camera position and attitude detecting section 304 then stores the generated information in the camera position and attitude storage section 306.

These processes may be executed by a method described in, for example, Andrew J. Davison, "Real-Time Simultaneous Localisation and Mapping with a Single Camera," Proceedings of the 9th International Conference on Computer Vision, Ninth (2003).

For each of the camera position (Cw) and the camera rotation matrix (Rw), the camera position and attitude detecting section 304 generates camera position and attitude information with presence probability distribution in accordance with normal distribution, and stores the generated information in the camera position and attitude storage section 306.

The images captured with the camera 301 are also input to the feature point tracking section 305. The feature point tracking section 305 obtains travel distance between frames of local areas (i.e., feature points) selected from the frame images obtained by the camera 301. For example, the feature point tracking section 305 obtains travel distance between frames of the feature points through window matching with a local area image of previous frame.

The result of feature point tracking obtained in the feature point tracking section 305 is recorded in the feature point loci (tracking) information storage section 307 as feature point tracking data.

The camera position and attitude storage section 306 and the feature point loci (tracking) information storage section 307 illustrated in FIG. 9 keep output results from all the frames about camera position and attitude information detected by the camera position and attitude detecting section 304 and feature point loci information detected by the feature point tracking section 305, respectively. It is assumed herein that frame times of the data are synchronized.

The three-dimensional information generating section 308 receives camera position and attitude information and feature point loci (tracking) information stored in the camera position attitude storage section 306 and the feature point loci (tracking) information storage section 307, executes SLAM on the basis if the status data corresponding to the submap, and estimates of position and attitude of the camera ("localization") and three-dimensional positions of the feature points ("mapping"). These processes include updating the status data corresponding to the submap, i.e., updating the status data corresponding to the submap using the Kalman filter and the Extended Kalman filter described above. The status data corresponding to the submap is stored in the status data storage section 309 (i.e., a database (DB) 3) and is updated on demand.

Note that, in the configuration illustrated in FIG. 9, each processing block may be configured as inherent hardware or may execute a predetermined program corresponding to each processing block in, for example, an information processing device, such as PC. For example, a program for execution of a processing sequence illustrated in FIG. 10 may be stored in a memory, and the program may be executed in a control section provided with a CPU as a program executing section. The processing sequence will be described later.

Figure 10:
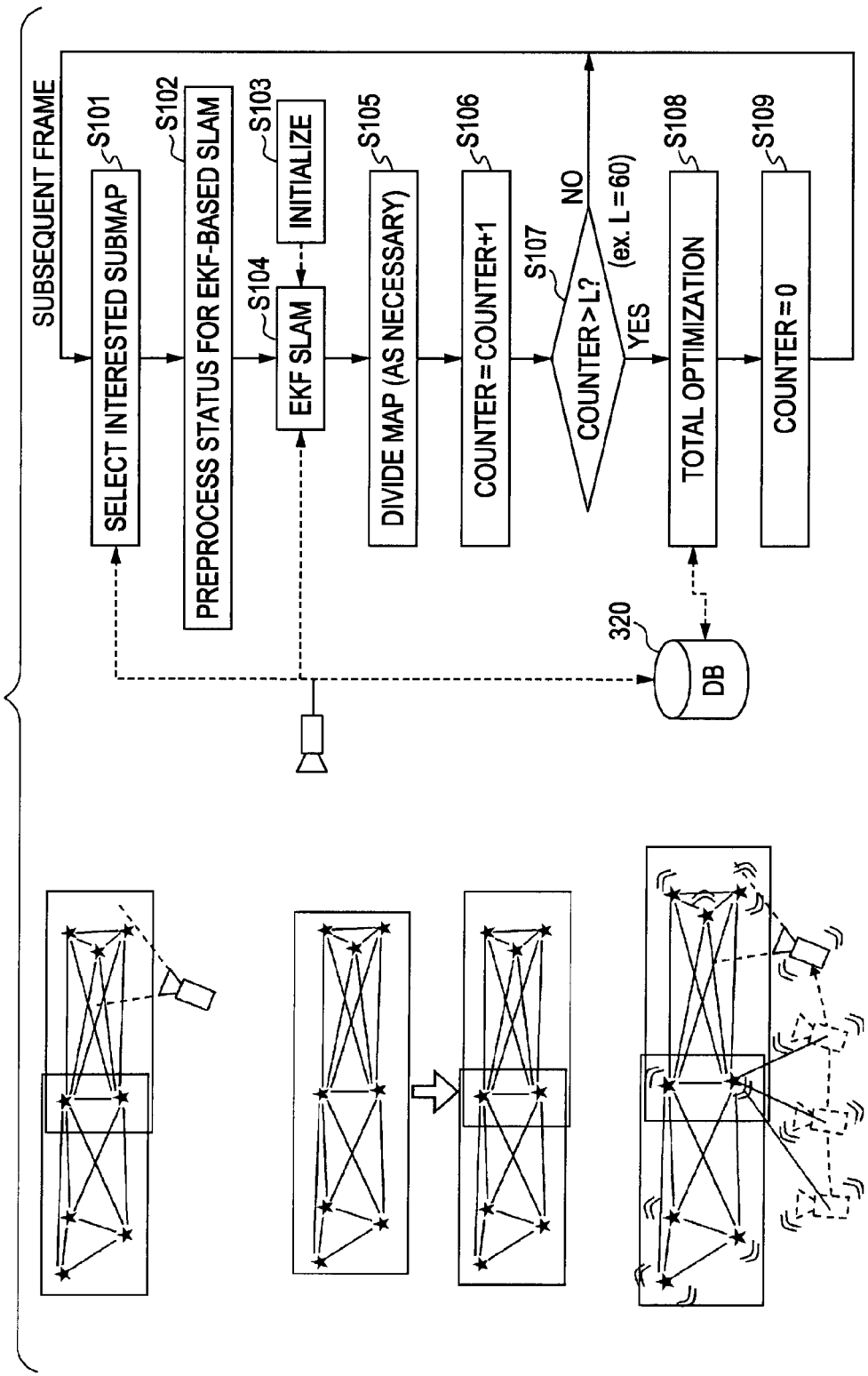
FIG. 10 is a flowchart of a process sequence executed in an information processing device according to an embodiment of the invention.

A processing sequence executed by the information processing device of the invention will be described with reference to a flowchart of FIG. 10. The process will be outlined first and then each step will be described in detail. Steps S101 to S107 in the flowchart of FIG. 10 are executed each time an image frame is input. It is assumed that the number of frames as the unit for total optimization in step S108 is L (e.g., L=60). The processes of step S101 to S107 are repeated for each input frame until the number of processing frames reaches L.

In step S107, when the number of frames reaches L, total optimization is executed in step S108. Then, a counter is reset to 0 in step S109 and the routine returns to step S101 where processes to a subsequent input frame is started.

The storage section (DB) 320 in FIG. 10 corresponds to four storage sections DB0 to DB3 illustrated in FIG. 9. The four storage sections DB0 to DB3 each correspond to the captured image storage section 302 (DB0), the camera position and attitude storage section 306 (DB1), the feature point loci (tracking) information storage section 307 (DB2) and the status data storage section 309 (DB3).

The entire process of the flowchart of FIG. 10 will be outlined.

In step S101, an interested submap is selected.

In step S102, "status data" relating to the interested submap is prepared.

In step S103, a processing frame is initialized (only for the first processing frame).

In step S104, the status data is updated on the basis of the status data of the interested submap. The status data is updated through, for example, EKF-based SLAM. Although an exemplary process using the EKF (Extended Kalman filter) will be described in the present embodiment, the Kalman filter may also be employed.

In step S105: the interested submap is divided as necessary. The interested submap is divided into two under predetermined conditions, e.g., when the number of the feature points exceeds a fixed upper limit number.

In step S106, a counted value of the number of processes (i.e., the number of processing frames) is updated (+1).

In step S107, it is determined whether the number of processes (i.e., the number of processing frames) has exceeded the predetermined number of processes L.

In step S108, total optimization is performed.

In step S109, the counted value is reset to 0.

The process of these steps is repeated.

The process of step S103 is executed only to the first processing frame, in which initialization is executed for the SLAM process if necessary. The first submap generated in the initializing step is a "submap M1."

Total optimization (i.e., "bundle adjustment") is performed for every predetermined number of frames, i.e., L frames. Total optimization is made to align submaps each other and make positions of the feature points in overlapping areas converge.

Hereinafter, each step of the flowchart of FIG. 10 will be described in detail.

Step S101: Selection of Interested Submap

Referring now to the flowchart of FIG. 11, a detailed sequence of selecting an interested submap in step S101 of the flowchart of FIG. 10 will be described.

In step S151, submap(s) including at least a part of an area to be processed for which a three-dimensional map is to be generated is generated. A single submap may be generated initially, or two or more submap areas may be generated through division of the area to be processed into two or more areas.

The area for which the three-dimensional map is to be generated is an area covered with the images captured with the camera 301 as illustrated in FIG. 9. For generation of the three-dimensional map, images captured with the camera 301 may be successively input in real time or may be obtained from the storage section.

The submap(s) may be generated in various manners. For example, when the entire map is already recognized, the entire map may be initially considered as a single submap or, alternatively, two or more submaps may be generated in advance. If two or more submaps are generated, the entire map can be divided on an arbitrary basis, such as travel distance of the camera, the number of captured frames and the capturing time.

When the images captured with the camera 301 are successively input in real time, a single submap is constituted of an area obtained by the successively input image frames. In this case, a single submap is generated initially and the submap area increases as the number of input image frames increases. The submap with increased size is divided into two submaps through map division in step S105, which will be described in detail later.

Figure 11:
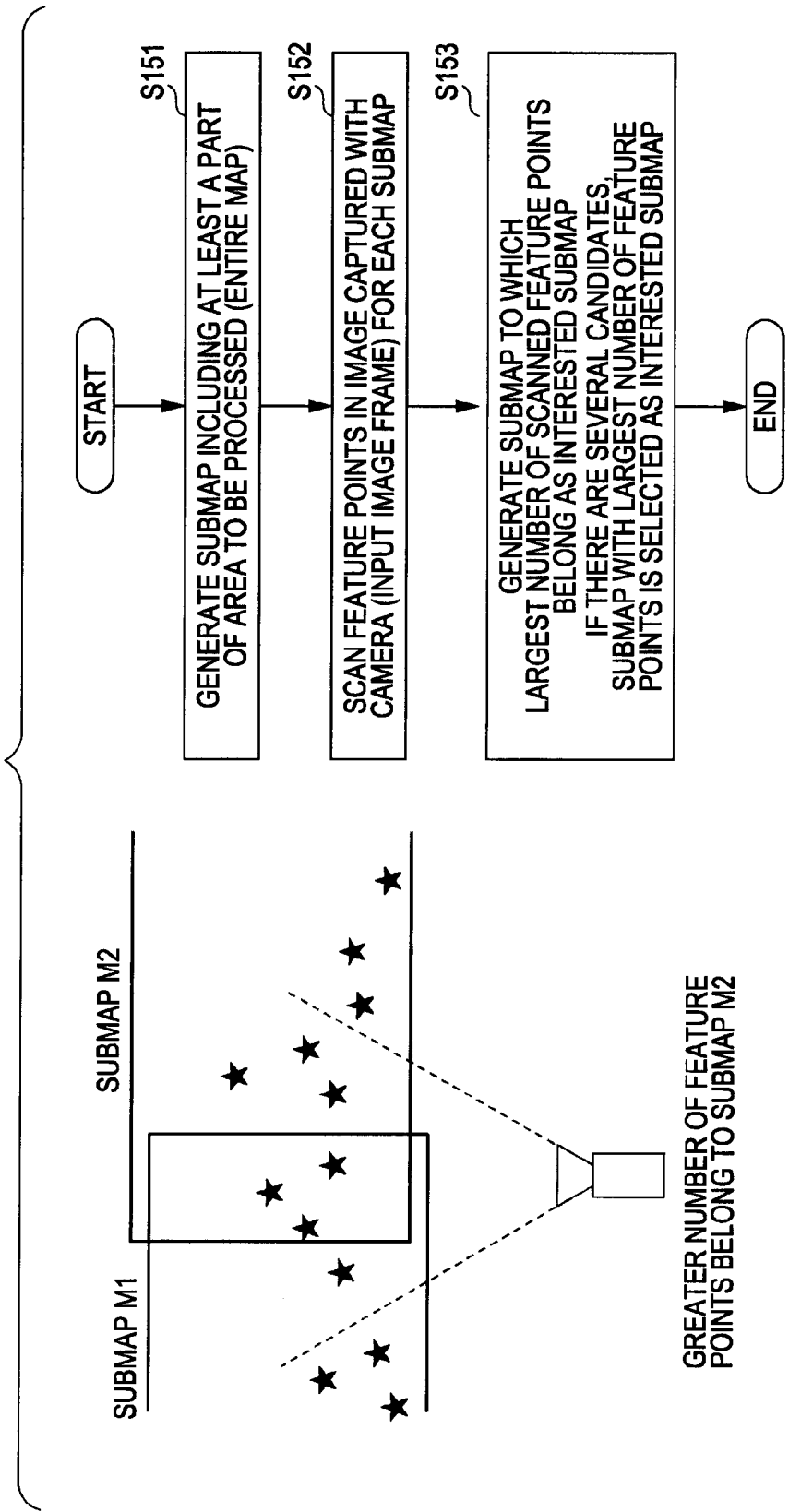
FIG. 11 is a detailed flowchart of a sequence for selecting an interested submap in step S101 in the flowchart of FIG. 10.

In step S152 in the flowchart of FIG. 11, feature points caught by the camera are scanned for each submap generated in step S151. The position and attitude of the camera are scanned on the basis of initial setting information or the estimation result from SLAM using the Kalman filter or the EKF and in accordance with a pinhole camera model (see FIGS. 3 and 4).

Next, in step S153, to which submap the scanned feature points belong is determined and a submap to which the largest number of feature points belong is defined as an interested submap. If there are two or more submaps to which the largest number of feature points belong, the submap with the largest number (ID) is selected as the interested submap. The interested submap is thus selected.

Step S102: Preparing "Status Data" Regarding Interested Submap

Next, a process of preparing "status data" regarding the interested submap in step S102 in the flowchart of FIG. 10 will be described with reference to the flowchart of FIG. 12.

First, a current interested submap identifier (ID) is saved in step S201. The current interested submap identifier (ID) is saved in order to, for example, recognize an interested submap identifier (ID (number)) corresponding to the precedent frame of the currently processed frame.

In step S202, it is determined whether the interested submap of the current frame differs from that in the precedent frame. If the determination result is affirmative, in step S203, camera information of the "status data" of the interested submap of the current frame is overwritten with camera information of the "status data" of the interested submap in the precedent frame.

The "status data" is constituted by multidimensional normal distribution data of status values which represents a status of the camera for capturing the images and the feature points as illustrated in FIG. 2. In particular, the "status data" is constituted by multidimensional normal distribution data which includes a mean vector and a variance-covariance matrix. The mean vector represents position, attitude, speed and angular speed of a camera and status values thereof, position information of each of feature points (P1 to PN). The status data is generated as the status data corresponding to the submap and includes only feature point information included in each submap as information regarding the feature points.

In step S203, when a new submap is processed, the status data corresponding to the submap of the preceding frame is employed regarding camera information included in the status data corresponding to the submap, i.e., information about position, attitude, speed, and angular speed of the camera.

Exemplary status data corresponding to the submap is illustrated in FIG. 13. The camera information in the current status data includes (a) a data area 321 of a mean vector and (b) a data area 331 of a variance-covariance matrix. The status data corresponding to the submap of the preceding frame is directly copied for these data areas.

In step S203, all the covariance values of the camera and the feature points included in the variance-covariance matrix in the status data are set to 0. The data is reset because the camera position for the preceding submap was obtained on the basis of the relationship with the feature points in the preceding submap and thus are not applied to the current submap.

All the covariance values of the (b) data areas 332 and 333 of the variance-covariance matrix illustrated in FIG. 13 are set to 0.

Pre-processing of the "status data" for EKF-based SLAM is thus completed.

Step S104: Updating of Status Data Using Status Data of Interested Submap

In step S104, status data is updated on the basis of the status data of the interested submap using, for example, Kalman filter and the Extended Kalman filter. The status data corresponding to the interested submap is updated on the basis of information obtained from an input frame, i.e., information about position, attitude, speed and angular speed of the camera, and the position information about each of the feature points.

The process using an Extended Kalman filter, i.e., the EKF-based SLAM, is described in, for example, Andrew J. Davison, "Real-Time Simultaneous Localisation and Mapping with a Single Camera," Proceedings of the 9th International Conference on Computer Vision, Ninth (2003). Japanese Unexamined Patent Application Publication No. 2008-304269, filed by the present applicant also discloses the EKF-based SLAM. These disclosed methods may be employed. Note that the status data used in the invention, i.e., the status data to be updated, is the status data corresponding to the submap. Position information and correlation information about the feature points other than those included in the submap are not included in the status data corresponding to the submap. Thus, data volume is reduced to facilitate a very high speed calculation.

If a new feature point that is not registered in the status data is detected in the input image frame used for updating of the status data corresponding to the submap, that new feature point is added to the status data as a variable.

Step S105: Division of Interested Submap

Next, division of the interested submap in step S105 in the flowchart of FIG. 10 will be described.

The interested submap is divided as necessary. The interested submap currently to be processed is divided under predetermined conditions.

Hereinafter, two exemplary division process will be described.

(a) dividing the interested submap when the number of the feature points included in the interested submap reaches the predetermined upper limit number or greater (b) spatially dividing the interested submap through projection approximation of a three-dimensional map to a two-dimensional map into regular intervals on the two-dimensional map The process of (a) will be described first.

An entire sequence of the division process will be described with reference to the flowchart of FIG. 14.

First, in step S301, the total number of the feature points in the interested submap is counted. Next, in step S302, it is determined whether the total number of the counted feature points equal to or greater than the predetermined upper limit number N.

If the determination result in step S302 is affirmative, the routine proceeds to step S303 where the interested submap which is currently to be processed is divided. If the determination result in step S302 is negative, the process is completed without dividing the interested submap.

The predetermined upper limit number N is determined in accordance with, for example, conditions of the camera. In this example, N=125.

A detailed sequence of "dividing the interested submap" of step S303 in the flowchart of FIG. 14 will be described with reference to the flowchart of FIG. 15. The submap is divided in the submap generating section 303 of the information processing device 300 illustrated in FIG. 9. The submap to be divided is the interested submap selected in the first step S101 in the flowchart of FIG. 10.

First, in step S451, it is determined whether the submap to be processed, i.e., the interested submap, has any overlapping area with other submap(s). If the determination result in step S451 is negative, the routine proceeds to step S452. If the determination result in step S451 is affirmative, the routine proceeds to step S453.

If the interested submap has no overlapping area with other submap(s), the routine proceeds to step S452 where the center of gravity of a group of the feature points in the interested submap is obtained and the feature point that is the most distant from the center of gravity is defined as a point G.

If the interested submap has any overlapping area with other submap(s), the routine proceeds to step S453 where the feature points belonging to other submap(s) are selected from among the feature points in the interested submap and the center of gravity of the selected group of the feature points is defined as a point G.

These processes are executed. These processes will be described with reference to FIG. 16.

Figure 16:
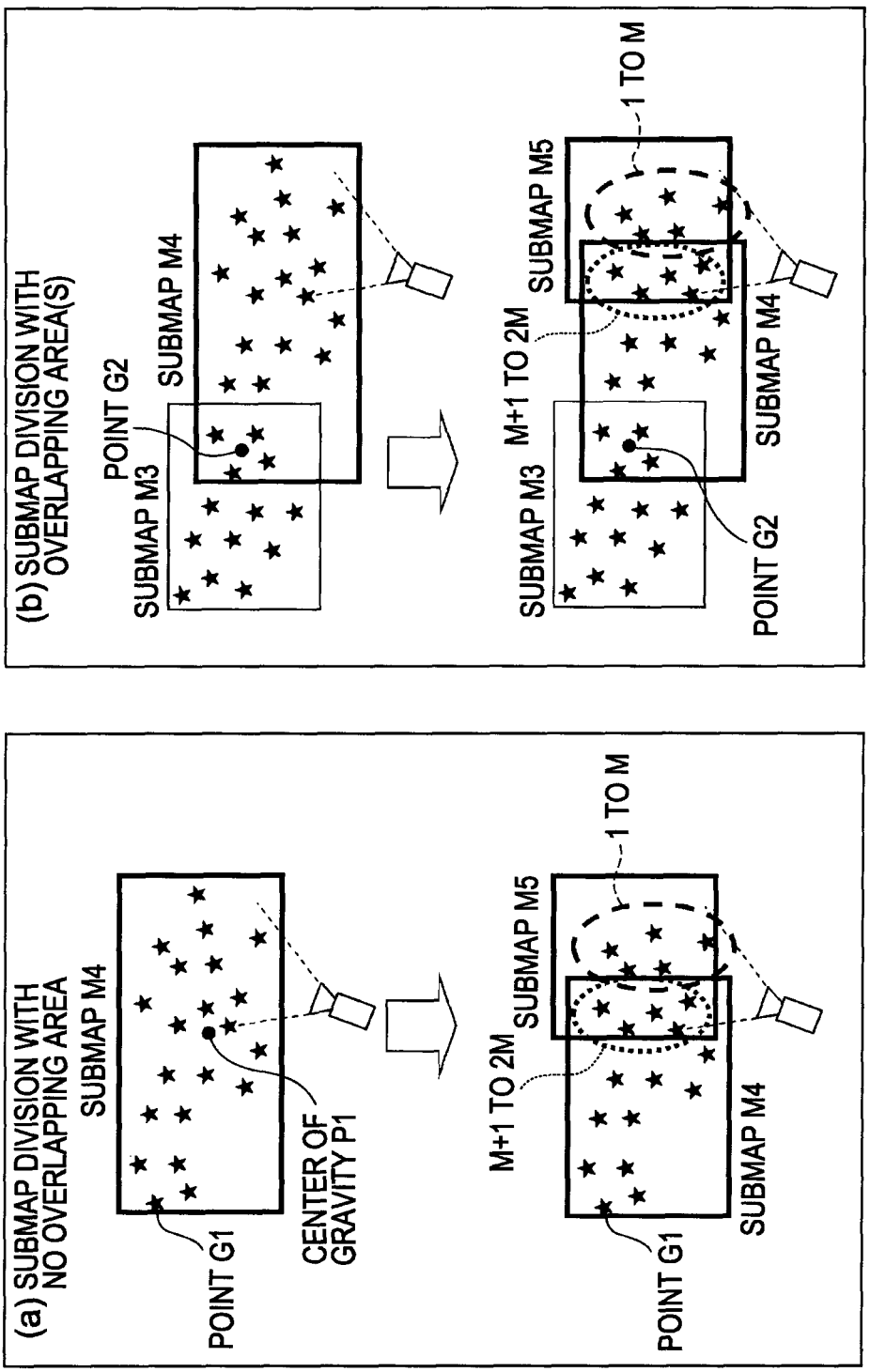
FIG. 16 illustrates an exemplary process of dividing a submap in steps S452 to S454 in the flowchart of FIG. 15.

FIG. 16 illustrates exemplary processes for (a) dividing the submap if there is no overlapping area between the submaps (process of step S452) and (b) dividing the submap if there is any overlapping area between the submaps (process of step S453).

The interested submap to be divided herein is the submap M4.

As illustrated in FIG. 16A, if there is no overlapping area between the submaps (process of step S452), the center of gravity P1 of the group of the feature points in the interested submap M4 is obtained and the feature point that is the most distanced from the center of gravity P1 is defined as the point G1.

As illustrated in FIG. 16B, if there is any overlapping area between the submaps (process of step S453), the feature points belonging to an overlapping submap M3 are selected from among the feature points in the interested submap M4 and the center of gravity of the group of the selected feature points is defined as the point G2.

After these processes are completed, the routine proceeds to step S454.

In step S454, the distance between the feature points belonging to the interested submap and the point G is calculated. The feature points are then arranged in descending order of distance from the point G to set the feature points corresponding to each submap in the following manner: first to Mth feature points belong to newly added submap(s); and (M+1)th to (2M)th feature points are in overlapping area(s) of the interested submap and newly added submap(s).

The newly added submap(s) are generated in the above-described process.

In an example, M=N×0.2 with N representing the number of the feature points in the interested submap.

When N=125, M=25. Fifty feature points is set in the newly added submap at the time of division of the submap. Among the 50 feature points, 25 feature points belong only to the newly added submap and the rest 25 feature points belong to the overlapping area of the newly added submap and the interested submap.

This process is illustrated in FIG. 16. In (a) dividing the submap if there is no overlapping area between the submaps, a newly added submap M5 is generated as illustrated in FIG. 16A. In (b) dividing the submap if there is any overlapping area between the submaps, a newly added submap M5 is set as illustrated in FIG. 16B.

Next, in step S455, "status data" of the interested submap which is not yet divided is copied to "status data" of a divided newly added submap.

Finally, in step S456, information about the "feature points not belonging to each submap" is deleted from the "status data" of the interested submap and the newly added submap. In this manner, status data of each submap is provided.

Figure 17:
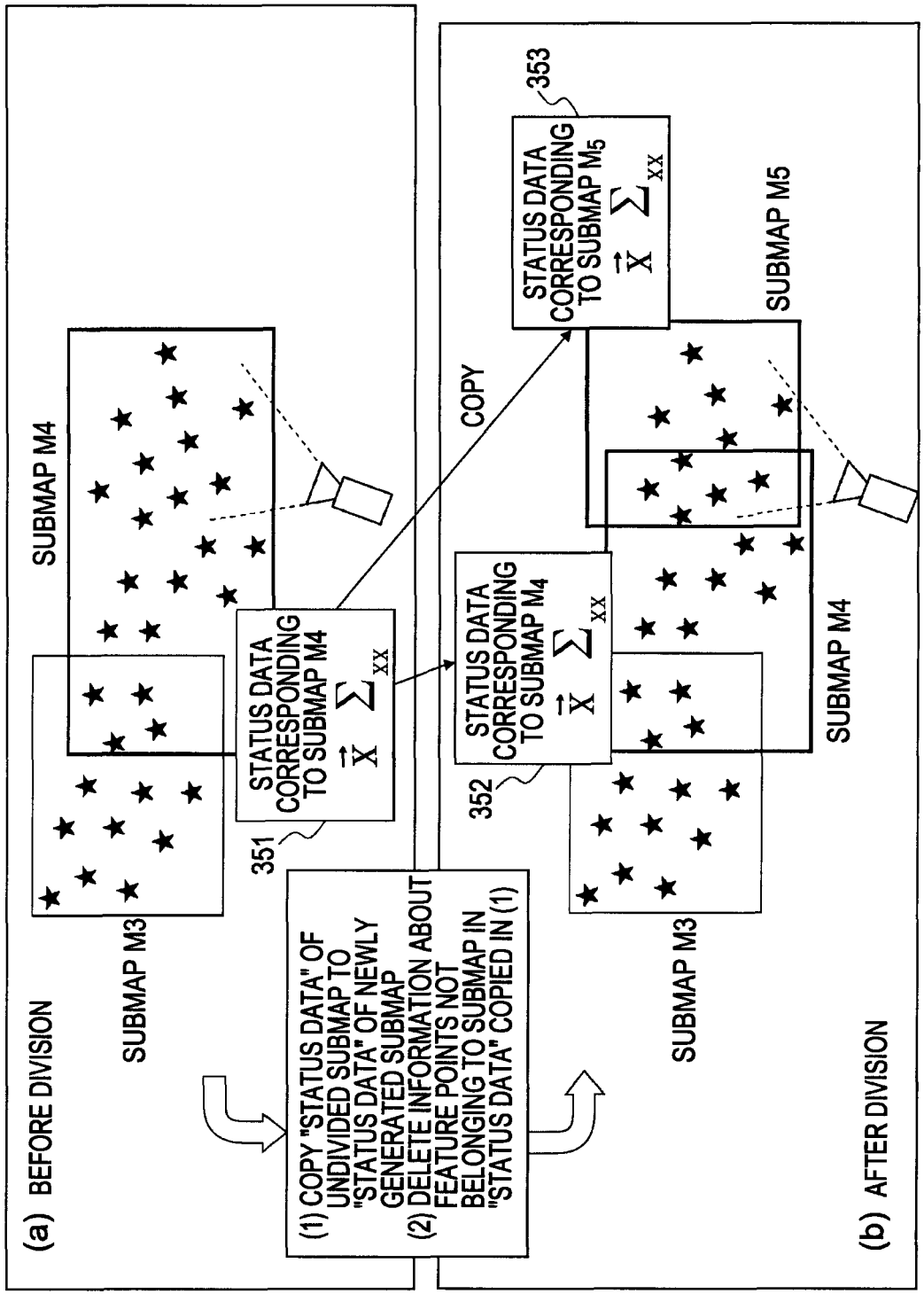
FIG. 17 illustrates an exemplary process for status data corresponding to a submap in steps S455 and S456 in the flowchart of FIG. 15.

These processes will be described in detail with reference to FIG. 17. FIG. 17 illustrates copying of the status data corresponding to the interested submap M4 which is to be divided.

FIG. 17A illustrates the submap M4 which is not yet divided and the status data 351 corresponding to the submaps M4. As described above with reference to FIG. 2, the status data is constituted by multidimensional normal distribution data which includes a mean vector and a variance-covariance matrix. The mean vector represents status values, such as position, attitude, speed and angular speed of a camera and position information of each of feature points (P1 to PN).

In step S455, the status data 351 corresponding to the submap M4 illustrated in FIG. 17A is set as the status data 352 corresponding to the submap M4 and the status data 353 corresponding to the submap M5, as illustrated in FIG. 17B. The status data 352 and 353 corresponding to the submaps are temporal data.

Information about the feature points not belonging to the submaps M4 and M5 is deleted from the status data 352 corresponding to the submap M4 and the status data 353 corresponding to the submap M5.

Figure 18:
FIG. 18 illustrates an exemplary process for status data corresponding to a submap in steps S455 and S456 in the flowchart of FIG. 15.

FIG. 18 illustrates an exemplary deleting process of information from a mean vector in the status data. FIG. 19 illustrates an exemplary deleting process of information from a variance-covariance matrix. In this manner, information about the feature points not belonging to the submaps M4 and M5 is deleted from the status data 352 corresponding to the submap M4 and the status data 353 corresponding to the submap M5 and then the final status data of each submap is updated and generated.

Figure 14:
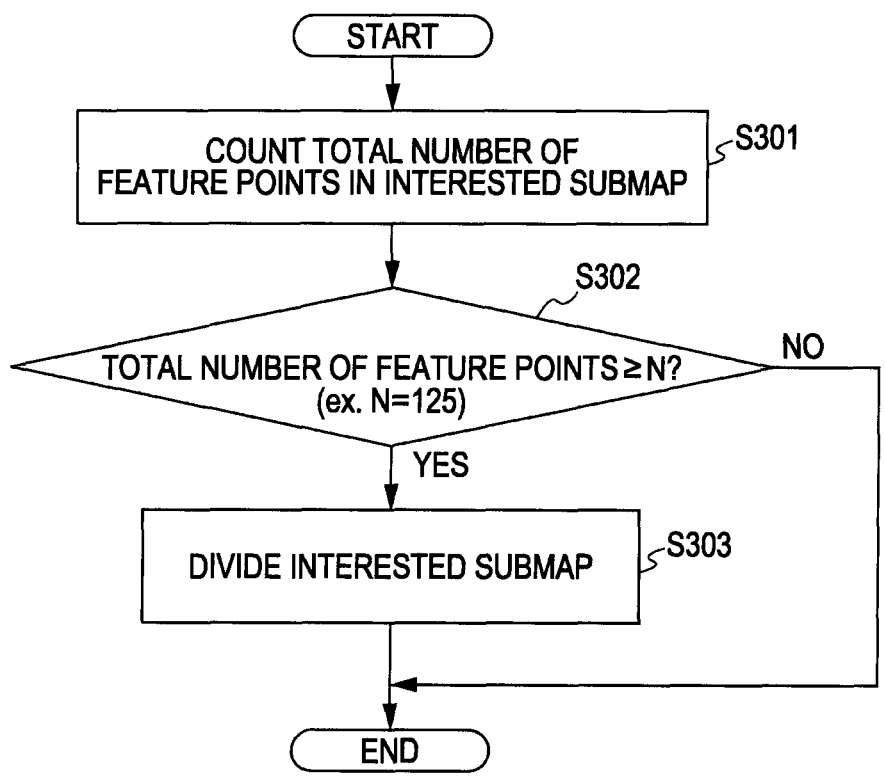
FIG. 14 is a flowchart of a process sequence for dividing an interested submap when the number of feature points included in the interested submap reaches a predetermined upper limit or greater.
Figure 15:
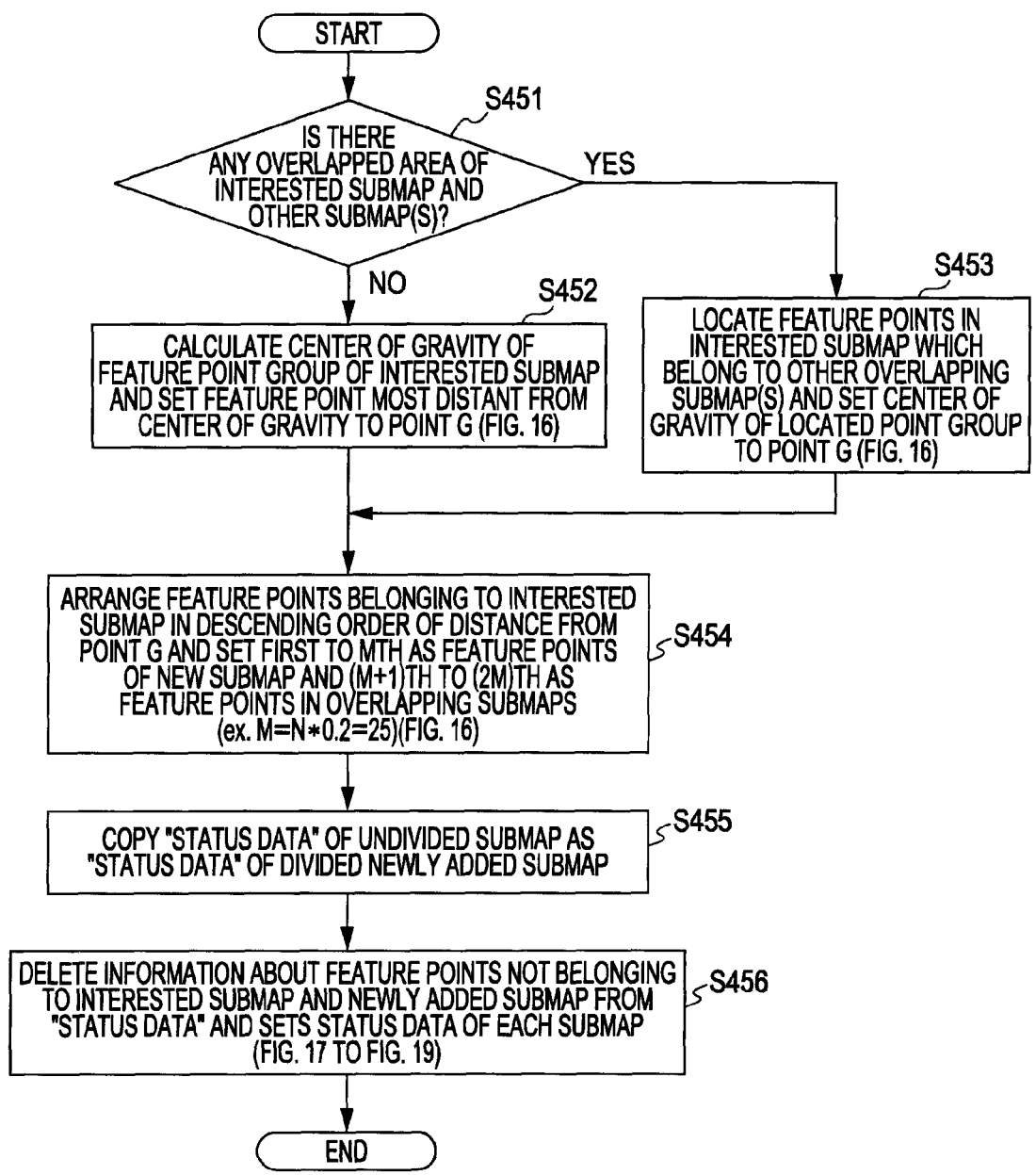
FIG. 15 is a detailed flowchart of a sequence for "dividing an interested submap" in step S303 in the flowchart of FIG. 14.

With this process, division of the interested submap of step S303 in the flowchart of FIG. 14 is completed. As described above, the division process of the submap in the flowchart of FIG. 14 is an exemplary division process of the interested submap executed in step S105 in the flowchart of FIG. 10.

As described above, the interested submap is divided in step S105 in the flowchart of FIG. 10 as necessary in, for example, either of the following processes.

(a) dividing the interested submap when the number of the feature points included in the interested submap reaches the predetermined upper limit number or greater (b) spatially dividing the interested submap through projection approximation of a three-dimensional map to a two-dimensional map into regular intervals on the two-dimensional map The processes described above with reference to FIGS. 14 to 19 are included in the process (a).

Next, below with reference to FIGS. 20 to 26, the process of (b) will be described.

A flowchart of an entire sequence of the submap division process is illustrated in FIG. 20.

With reference to the flowchart of FIG. 20, the process for spatially dividing an interested submap through projection approximation of a three-dimensional map onto a two-dimensional map into regular intervals on the two-dimensional map will be described.

Before the process of the flowchart of FIG. 20 is started, the following parameters are determined to the three-dimensional space to be processed as a process of step S500.

vector k
vector $r_1$
vector $r_2$
division center O
distance d and e

These parameters will be described with reference to FIG. 21.

Figure 21:
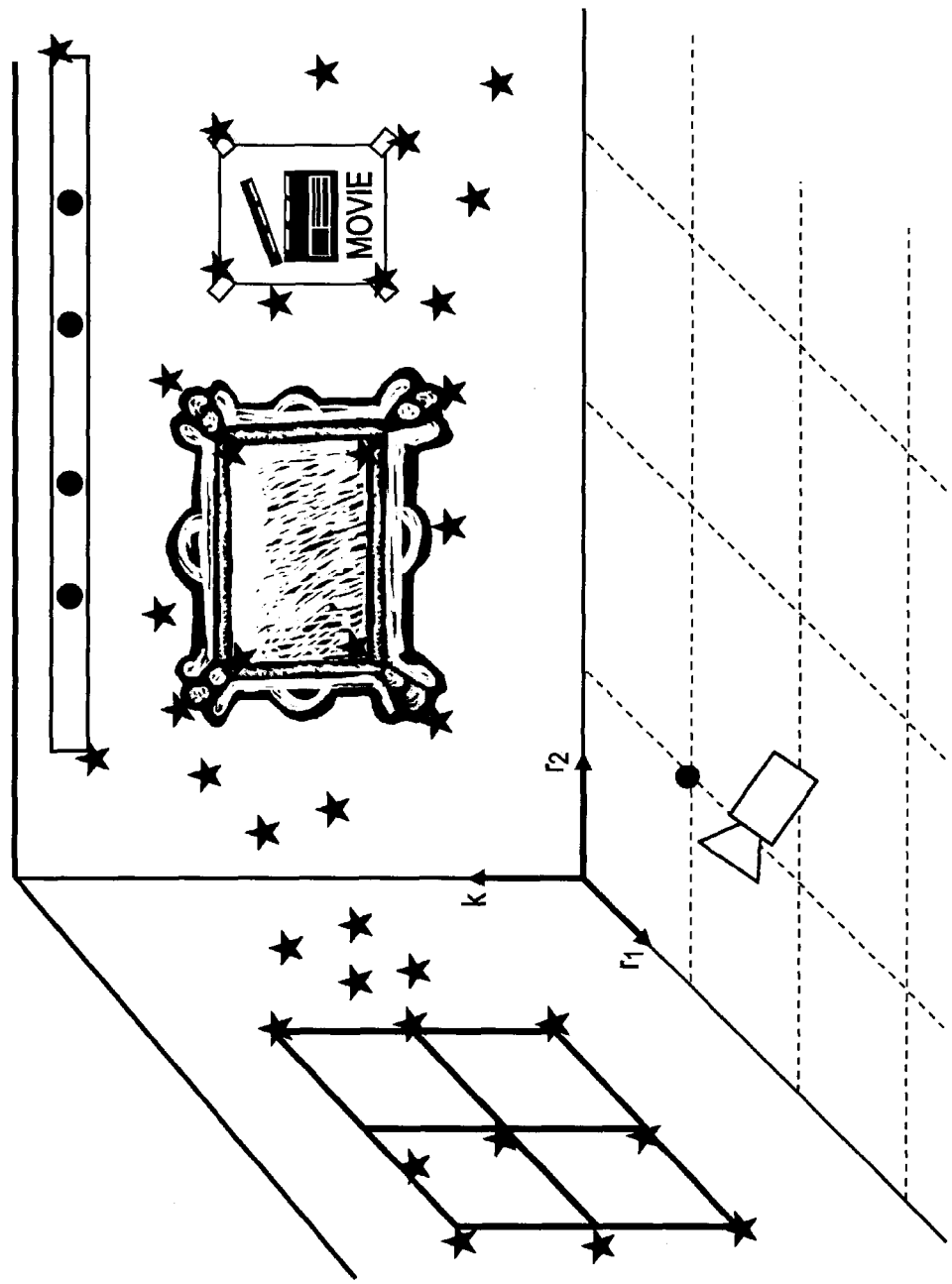
FIG. 21 illustrates an exemplary process for spatially dividing an interested submap through projection approximation of a three-dimensional map onto a two-dimensional map into regular intervals on the two-dimensional map.

FIG. 21 illustrates space (i.e., a room) for which a three-dimensional map is to be generated. Three-dimensional positions of many feature points set in the space are calculated.

The vector k represents a direction of projection to a two-dimensional map and is determined suitably. Here, a map of a room illustrated in FIG. 21 is taken as an example. It is considered to be suitable that a vector vertical to the floor surface is set as the vector k as illustrated in FIG. 21.

The vectors $r_1$ and $r_2$ represent coordinate axis vectors of the two-dimensional map in the three-dimensional space as illustrated in FIG. 21. The vectors r1 and r2 are set to satisfy the following conditions.

(Condition 1) The vector k and the coordinate axes $r_1$ and $r_2$ of the two-dimensional map generated through projective transformation are mutually orthogonal to each other.

(Condition 2) The coordinate axes r1 and r2 of the two-dimensional map are mutually orthogonal to each other.

The vectors are suitably set to satisfy these conditions.

These vectors, k, $r_1$ and $r_2$ are represented as a 3×1 matrix.

Figure 22:
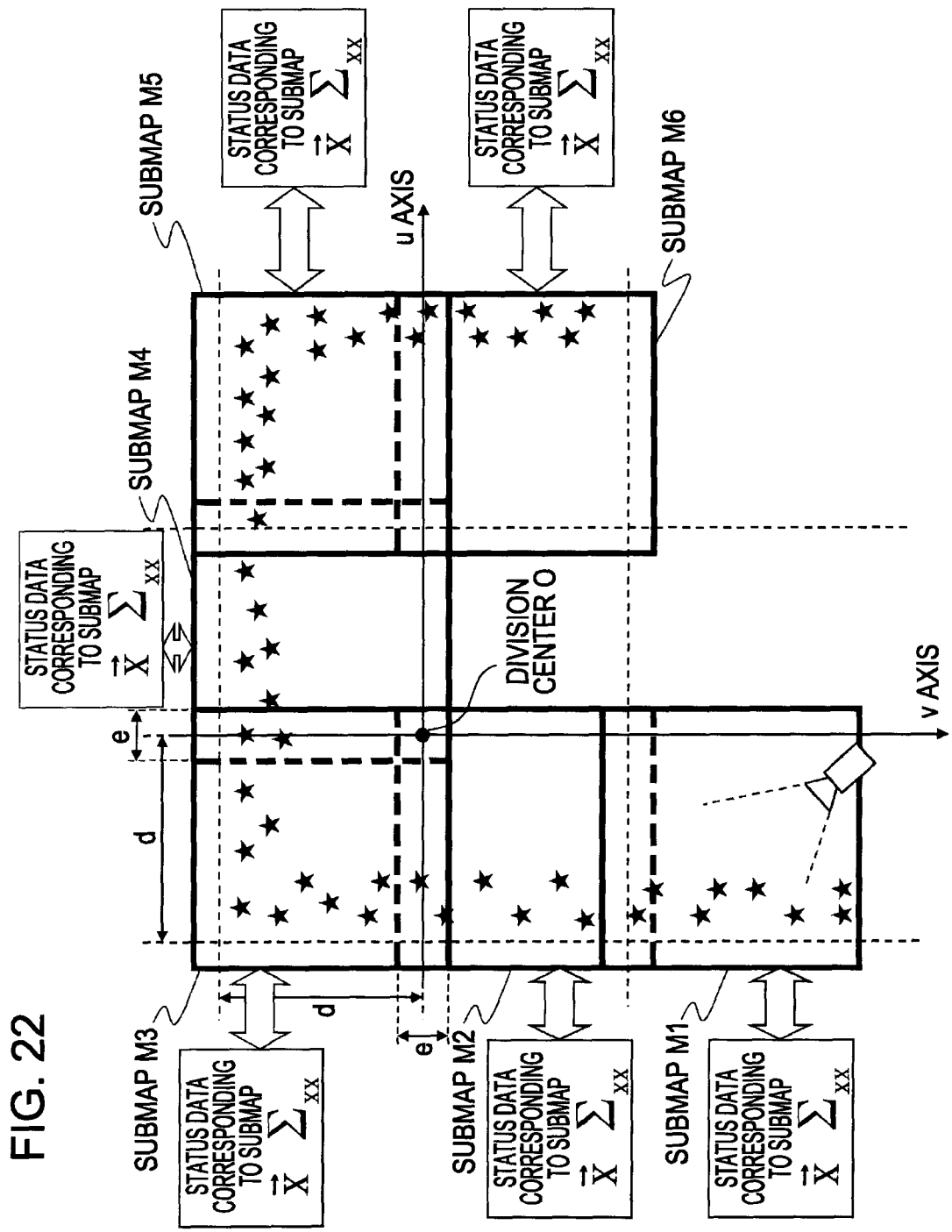
FIG. 22 illustrates an exemplary process for spatially dividing an interested submap through projection approximation of a three-dimensional map onto a two-dimensional map into regular intervals on the two-dimensional map.

The division center O is a reference point of division in the two-dimensional map generated through projection as illustrated in FIG. 22.

The distance d is distance between submaps generated in the two-dimensional map generated through projection as illustrated in FIG. 22.

The distance e is an overlapping width of an overlapping area of the submaps generated in the two-dimensional map generated through projection as illustrated in FIG. 22.

In step S501 of FIG. 20, all the feature points belonging to the map of the three-dimensional space are projected to the two-dimensional map. Projective transformation may be achieved using the following Equation A as illustrated in FIG. 20.

$$\begin{bmatrix} u \\ v \\ \lambda \end{bmatrix} = [r_1 \ r_2 \ k]^T \cdot \begin{bmatrix} X \\ Y \\ Z \end{bmatrix} \quad \text{(Equation A)}$$

In Equation A, X, Y and Z represent positions of the feature points in the three-dimensional space, u and v represent positions of the feature points on the two-dimensional map and λ represents an arbitrary number.

Next, in step S502, the feature point map projected to the two-dimensional map is divided into submaps. As illustrated in FIG. 22, the map is divided into regular intervals with the division center O as the center and with the distance d and e.

FIG. 22 includes six submaps M1 to M6 illustrated with thick lines. In the two-dimensional map generated through projection with the division center O being a division reference point, six submaps are generated with the submap interval being d and the overlapping width in the overlapping areas of submaps being e. This process is for spatially dividing the interested submap through projection approximation of a three-dimensional map onto a two-dimensional map into regular intervals on the two-dimensional map. If it is necessary to generate a new submap, the newly added submap is identified with a newly allocated identifier different from those for existing submaps, e.g., an identifier with a number obtained by adding 1 to the maximum number of the existing identifiers.

As described above, division of a map into submaps in step S105 of FIG. 10 is performed by either of the following processes:

(a) dividing the interested submap when the number of the feature points included in the interested submap reaches the predetermined upper limit number or greater described with reference to FIGS. 14 to 19; or (b) spatially dividing the interested submap through projection approximation of a three-dimensional map to a two-dimensional map into regular intervals on the two-dimensional map described with reference to FIGS. 20 to 22.

These processes (a) and (b) may be combined together.

Description of the flowchart of FIG. 10 will be continued. After the division of the map is completed as necessary in step S105, the counter of the input frame is updated in step S106. That is, the counter is updated to gain 1 for each processing frame.

Next, in step S107, the number of frames L as the predetermined unit for total optimization in step S108 and the counter value are compared. If the counter value is smaller than L, the processes of step S101 to S107 are repeated for each input frame until the processing frame reaches L. L is, for example, 60 frames.

In step S107, when the number of frames reaches L, total optimization is executed in step S108. In step S109, the counter is reset to 0 and the routine returns to step S101 where processes for the subsequent input frame is started.

Figure 23:
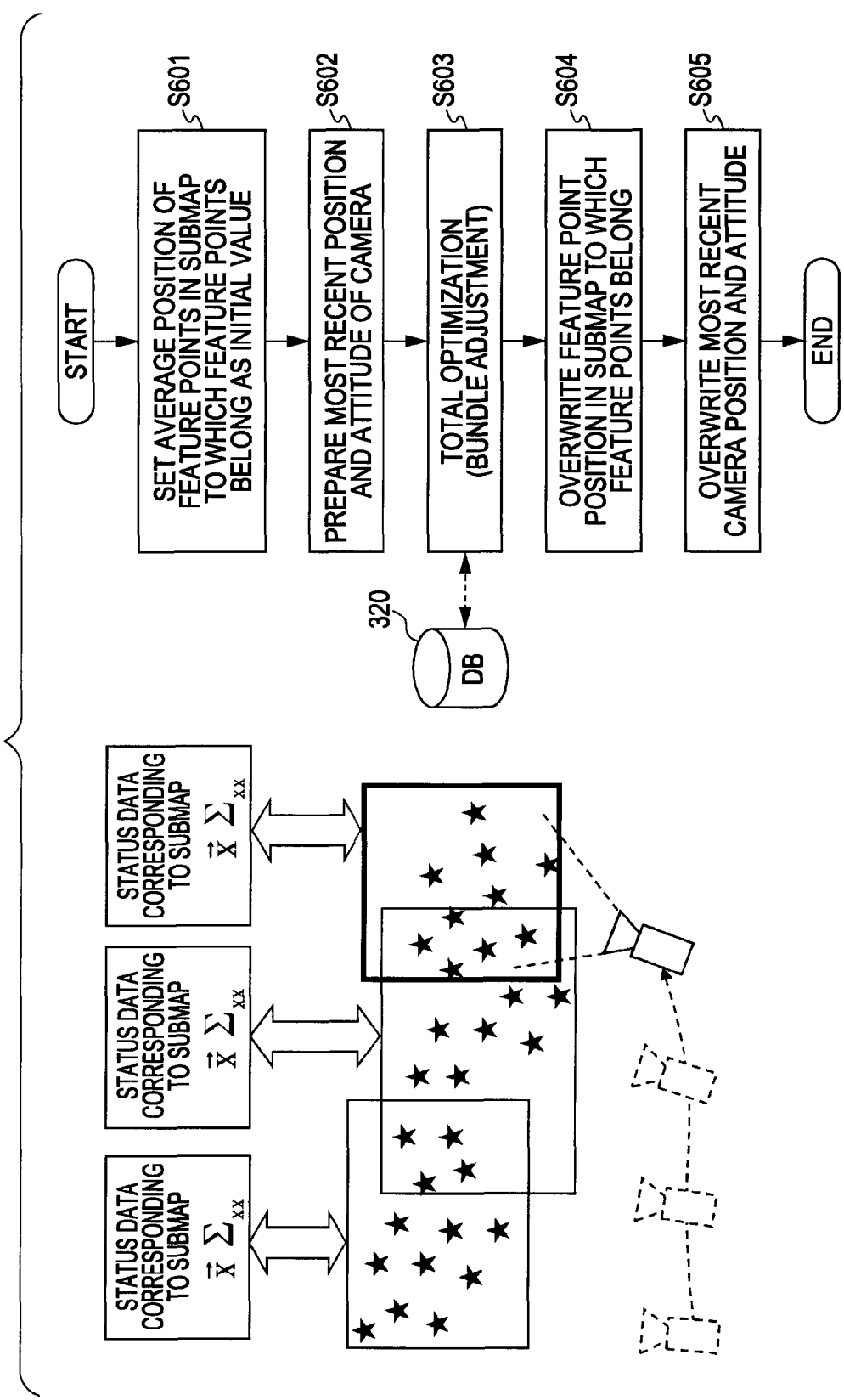
FIG. 23 is a detailed flowchart of a sequence for total optimization of step S108 in the flowchart of FIG. 10.

Total optimization in step S108 will be described with reference to FIGS. 23 and 24. A detailed sequence of total optimization in step S108 will be described with reference to the flowchart of FIG. 23.

Total optimization is performed through bundle adjustment. Bundle adjustment will be outlined with reference to FIG. 24 before describing the flowchart of FIG. 23.

Figure 24:
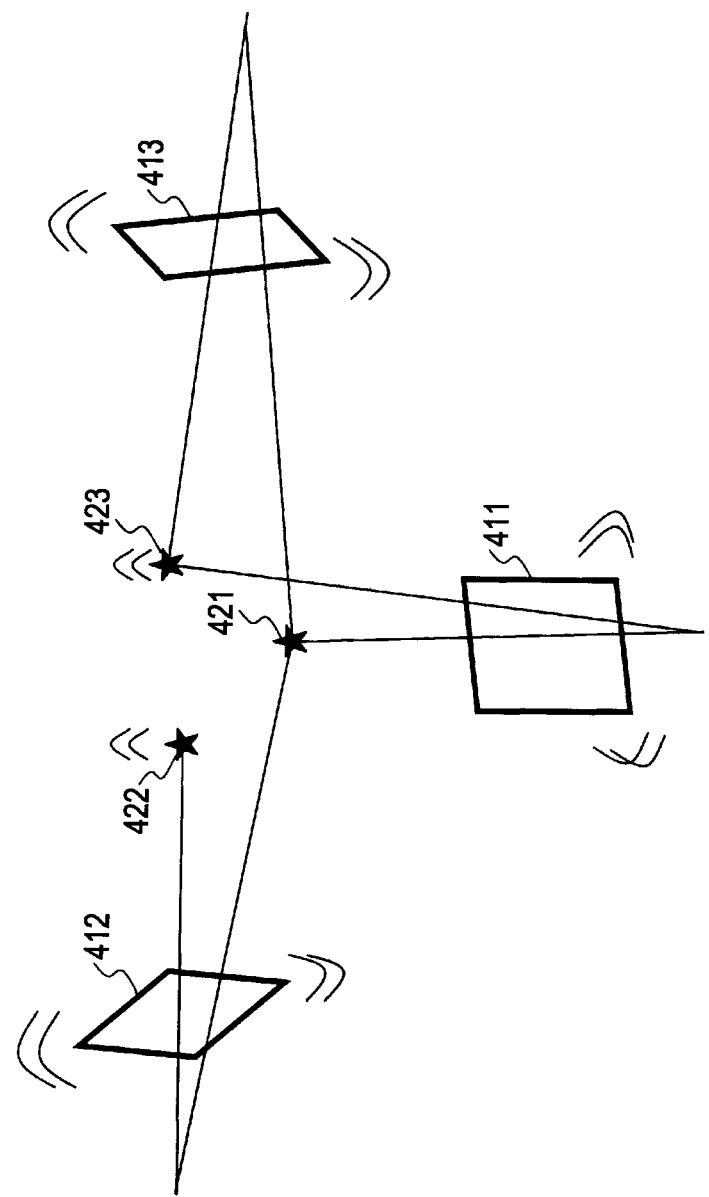
FIG. 24 illustrates bundle adjustment.

In exemplary bundle adjustment, as illustrated in FIG. 24, captured images 411 to 413 at three different positions are used to obtain three-dimensional positions of feature points using feature points 421 to 423 detected from the captured images 411 to 413. As in the feature point 421 illustrated in FIG. 24, regarding positions of the corresponding feature points among the feature points included in two or more images, lines (i.e., bundles) connecting capturing points of each image and the feature point 421 should intersect at the single feature point 421.

However, information, such as camera position and position information of the feature points in the image, is not necessarily calculated accurately, and has errors due to various factors. Such errors should be corrected. In particular, correction is made so that a line connecting a three-dimensional position of a particular corresponding feature point and a camera position might intersect at that feature point. It is therefore necessary to correct the camera position and the feature point position which are already calculated. This process is executed as bundle adjustment. Thus, three-dimensional information with higher accuracy can be generated using feature point position information and camera position information corrected through bundle adjustment. Bundle adjustment can be provided with related art approaches including that disclosed in M. I. A. Lourakis and A. A. Argyros "The Design and Implementation of a Generic Sparse Bundle Adjustment Software Package Based on the Levenberg-Marquardt Algorithm" August 2004.

Each step of the flowchart of FIG. 23 will be described. This process is executed by the three-dimensional information generating section 308 illustrated in FIG. 9. In this process, the following information is input: history of position and attitude of the camera; all the feature point positions in the most recent frame; and a feature point tracking result (i.e., positions of feature points in an image and all images relating to the history of camera position).

The history of the camera position and the feature point tracking result are obtained from the result of the EKF-based SLAM process (i.e., the process in step S104 of the flowchart of FIG. 10) executed for each frame.

First, in step S601, the feature point position of the most recent frame is obtained from the status data of the submap to which the feature point belongs. The feature point position is obtained from the mean vector (FIG. 2A) of the status data of the submap to which the feature point belongs. Regarding the feature points (d and e of FIG. 7) belonging to two or more submaps, position information of the feature points of the number of submaps to which the feature points belong is obtained from the mean vector of the status data of each submap to which the feature points belong and then an average value of the obtained feature point position is calculated. The obtained feature point position is defined as an initial value.

In step S602, the most recent camera position and attitude information is obtained. The information can be obtained from the status data of the submap to be processed.

In step S603, total optimization is executed through bundle adjustment as described with reference to FIG. 24. In particular, two or more image frames having the same feature point caught therein are obtained and the positions of that feature point in these image frames are made to correspond to each other.

With this process, the feature point position is adjusted finely. It is therefore necessary to update the status data of the submap on the basis of the finely adjusted feature point position information. In particular, the finely adjusted feature point position in the submap to which each feature point belongs is overwritten in step S604. The feature points (d and e in FIG. 7) belonging to two or more submaps overwrites a mean vector of the status data of each submap to which the feature points belong (FIG. 2A) with optimized position information.

In step S605, the most recent camera position and attitude are overwritten.

In this manner, total optimization in step S108 of the flowchart illustrated in FIG. 10 is completed.

Due to its heavy calculation load, the total optimization is performed once for every L frames as illustrated in the flowchart of FIG. 10.

In this manner, the feature point position necessary for generation of the three-dimensional map of the invention is calculated.

As can be understood from the description above, in the process of the invention, the entire area for which the three-dimensional map is to be generated is divided into two or more submaps and status data corresponding to each submap is generated. The status data corresponding to the submap is updated using the Kalman filter or the Extended Kalman filter (EKF). With this configuration, a calculation amount during updating the status data can be reduced significantly and efficient SLAM, i.e., analysis of three-dimensional positions of the feature points, calculation of position and attitude of the camera and generation of the three-dimensional environment map, is achieved.

4. Additional Approach to Generate Submap(s)

In the foregoing description regarding generation of submaps, adjacent submaps preferably have an overlapping area with common feature points caught therein. The reason for this will be described with reference to FIGS. 25 and 26.

The reason why adjacent submaps preferably have an overlapping area with common feature points caught therein is that the overlapping area provides more accurate total optimization (i.e., bundle adjustment) of the map.

Figure 25:
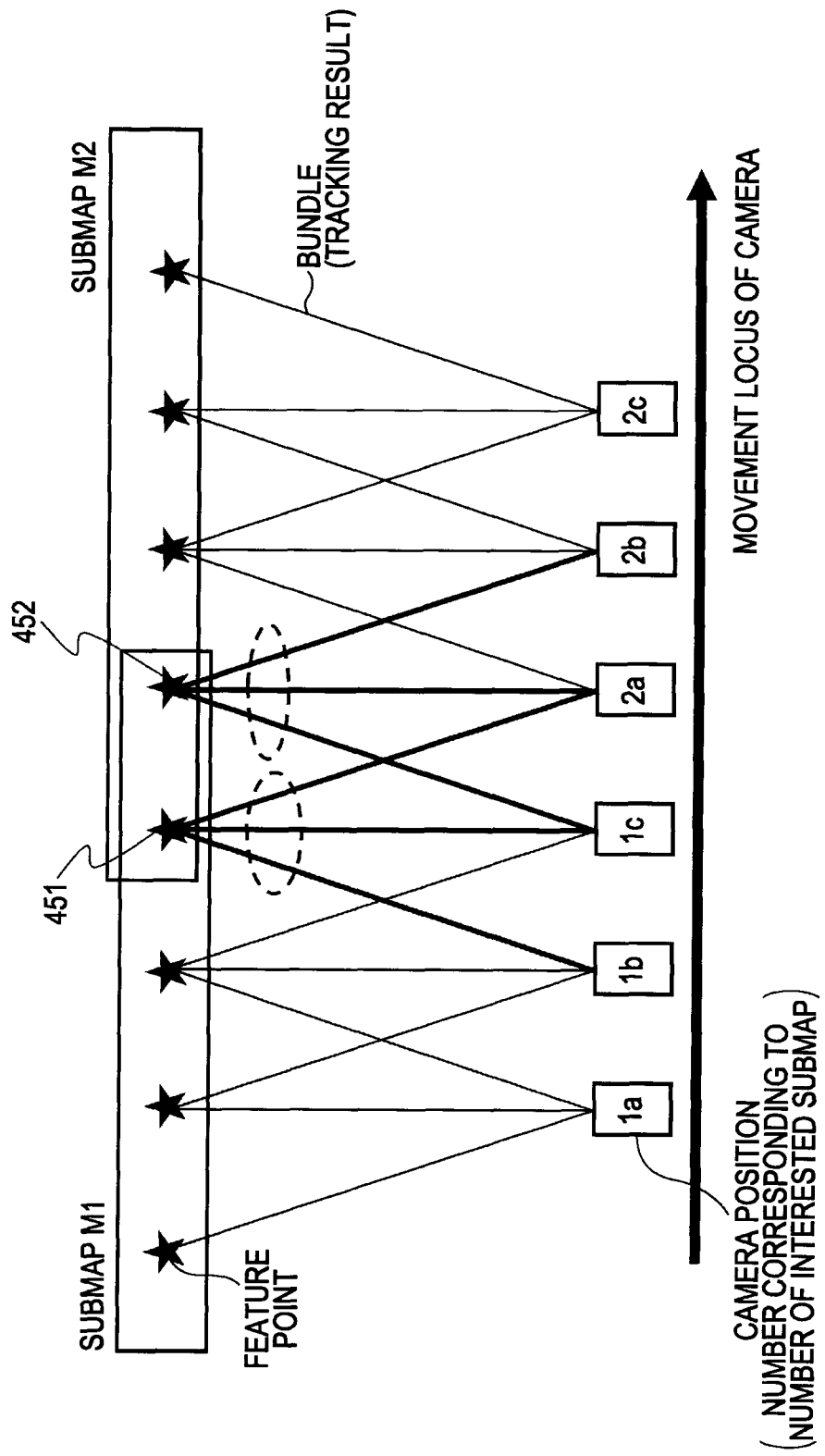
FIG. 25 explains necessity of an overlapping area of submaps.

FIG. 25 illustrates an example in which adjacent submaps are arranged in an overlapped manner. Star marks represent the feature points. The camera captures images at positions 1a, 1b, 1c, 2a, 2b and 2c while moving from left to right along an illustrated movement locus.

The camera captures an image of an area of the submap M1 at 1a.

The camera captures an image of an overlapping area of the submaps M1 and M2 at 1b, 1c, 2a and 2b.

The camera captures an image of an area of the submap M2 at 2c.

Straight lines connecting each of the camera positions 1a, 1b, 1c, 2a, 2b and 2c and the feature points illustrated with star marks represent the bundle (tracking result) of the feature points.

With this configuration, bundle adjustment of feature points 451 and 452 will be described. For example, the feature point 451 which belongs to both the submaps M1 and M2 will be discussed. There are three pieces of bundle information (i.e., tracking results) connecting the feature point 451 and each of the camera positions 1b, 1c and 2a. The bundle (i.e., tracking information) connecting the feature point 451 and each of the camera positions 1b, 1c and 2a is generated through EKF-based SLAM (step S104 in the flowchart of FIG. 10) as described above. Only a single submap is input to the EKF-based SLAM.

Since the interested submap is the submap M1 when the camera is at the positions 1b and 1c, the bundle (i.e., tracking information) connecting the feature point 451 and each of the camera positions 1b and 1c is generated from the submap M1 through EKF-based SLAM.

Since the interested submap is the submap M2 when the camera is at the position 2a, the bundle (i.e., tracking information) connecting the feature point 451 and the camera position 2a is generated from the submap M2 through EKF-based SLAM.

Although each bundle connecting the feature point 451 and each of the camera positions 1b, 1c and 2a is generated from different submaps, since it is recognized that the feature point 451 belongs to both the submaps M1 and M2, the bundles meet at the feature point 451.

Bundle information at three different camera positions 1b and 1c and 2a can be used in bundle adjustment to thereby achieve bundle adjustment described with reference to FIG. 24.

The feature point 452 which belongs to both the submaps M1 and M2 will be discussed. There are three pieces of bundle information (i.e., tracking results) connecting the feature point 452 and each of the camera positions 1c, 2a and 2b. The bundle (i.e., tracking information) connecting the feature point 452 and each of the camera positions 1c, 2a and 2b is generated through EKF-based SLAM (step S104 in the flowchart of FIG. 10) as described above. Only a single submap is input to the EKF-based SLAM.

Since the interested submap is the submap M1 when the camera is at the position 1c, the bundle (i.e., tracking information) connecting the feature point 452 and the camera position 1c is generated from the submap M1 through EKF-based SLAM.

Since the interested submap is the submap M2 when the camera is at the positions 2a and 2b, the bundle (i.e., tracking information) connecting the feature point 452 and each of the camera positions 2a and 2b is generated from the submap M2 through EKF-based SLAM.

Although each bundle connecting the feature point 452 and each of the camera positions 1c, 2a and 2b is generated from different submaps, since it is recognized that the feature point 452 belongs to both the submaps M1 and M2, the bundles meet at the feature point 452.

Bundle information at three different camera positions 1c, 2a and 2b can be used in bundle adjustment to thereby achieve bundle adjustment described with reference to FIG. 24.

As opposed to the configuration described above, FIG. 26 illustrates an example in which submaps are generated in a non-overlapping manner with the same feature point arrangement as that illustrated in FIG. 25. As compared with the example of FIG. 25, bundles connecting the feature point 451 and the camera position 2a or connecting the feature point 452 and the camera position 1c are not provided in the example of FIG. 26.

The bundle connecting the feature point 451 and the camera position 2a is not provided from the following reason. Only a single submap is input for EKF-based SLAM during generation of a bundle (i.e., a tracking result). When the camera is at the position 2a, the interested submap is M2. Here, the feature point 451 which belongs only to the submap M1 is not input for EKF-based SLAM. Accordingly, since the bundle (i.e., the tracking result) connecting the feature point 451 and the camera position 2a is not generated through EKF-based SLAM, the bundle is not provided in the example of FIG. 26.

Similarly, the bundle connecting the feature point 452 and the camera position 1c is not provided from the following reason. Only a single submap is input for EKF-based SLAM during generation of a bundle (i.e., a tracking result). When the camera is at the position 1c, the interested submap is M1. Here, the feature point 452 which belongs only to the submap M2 is not input for EKF-based SLAM. Accordingly, since the bundle (i.e., the tracking result) connecting the feature point 452 and the camera position 1c is not generated through EKF-based SLAM, the bundle is not provided in the example of FIG. 26.

Figure 26:
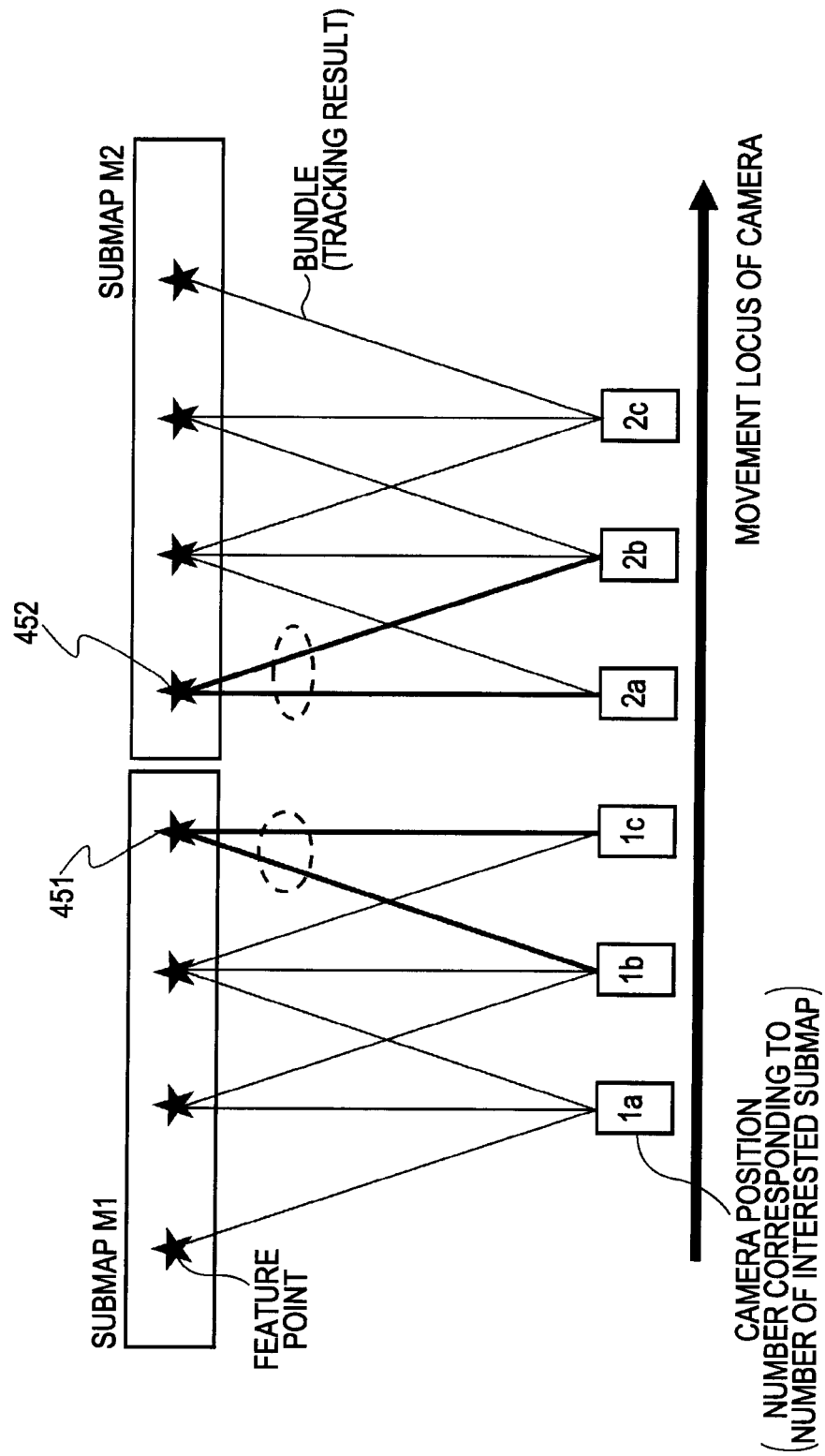
FIG. 26 explains necessity of an overlapping area between submaps.

In FIG. 26, when bundle adjustment of the feature point 451 of the submap M1 is to be executed, only bundle information at two different camera positions 1b and 1c corresponding to the submap M1 can be used.

Similarly, when bundle adjustment of the feature point 452 of the submap M2 is to be executed, only bundle information at two different camera positions 2a and 2b corresponding to the submaps M2 can be used.

No bundle representing correlation between the submaps M1 and M2 is provided in FIG. 26. With this configuration, there arises a problem that total optimization of FIG. 24 optimizes the submap M1 and the submap M2 independently and, therefore, boundaries of the submaps (e.g., relationship of positions and attitudes of the feature point 451, the feature point 452, the camera position 1c and the camera position 2a in FIG. 26) is not subject to bundle adjustment (i.e., total optimization).

As a result, in some cases where no overlapping area is provided between adjacent submaps, the feature points at end portions of the submaps are not subject to bundle adjustment. In this case, precision of the three-dimensional positions of the feature points may decrease. From this reason, overlapping area(s) having common feature point(s) caught therein are preferably provided between adjacent submaps during generation of the submaps.

The invention has been described with reference to specific embodiments. However, one skilled in the art appreciates that various modifications and substitutions can be made without departing from the scope of the present invention. The invention has been disclosed for the illustrative purposes only and should not be interpreted restrictively. The scope of the invention is therefore to be determined solely by the appended claims.

A series of processes described in the foregoing specification can be executed by hardware, software or a composite structure thereof. When the processes are executed by software, a program having a process sequence recorded thereon may be installed in a memory in a computer incorporated in dedicated hardware. Alternatively, the program may be installed in a general purpose computer which can execute various processes.

The program may be recorded in advance on a recording medium, such as a hard disk or a read only memory (ROM). The program may also be stored (i.e., recorded) temporarily or permanently in a removable recording medium, such as a flexible disk, a compact disc read only memory (CD-ROM), a magneto-optical (MO) disc, a digital versatile disc (DVD), a magnetic disc and semiconductor memory. Such a removable recording medium can be provided as a software package.

The program may be installed in a computer from a removable recording medium as described above. Alternatively, the program may be downloaded to the computer from a download site via a network, such as wireless network, local area network (LAN) and the Internet. The computer may receive the thus transmitted program and the program may be installed in a recording medium, such as an internal hard disk.

Various processes described in the foregoing specification are not necessarily executed in the time sequence described above but may be executed in parallel or individually in accordance with the capability of devices which execute the processes or in accordance with the necessity. The term "system" used herein describes a logical collective configuration of plural devices, which are not necessarily in a single housing.

The present application contains subject matter related to that disclosed in Japanese Priority Patent Application JP 2009-192091 filed in the Japan Patent Office on Aug. 21, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
   at least one processor configured to:
   obtain position and attitude of a camera and three-dimensional positions of feature points corresponding to successively received images from two or more different viewpoints, the images being captured using the camera, and the camera moving within a space
   generate one or more submaps corresponding to an area for which the three-dimensional positions of the feature are to be calculated, the submaps are generated based on at least one of the number of captured frames or the capturing time;
   determine whether a number of feature points included within a first one of the submaps exceeds a predetermined threshold number; and
   when the number of feature points within the first submap exceeds the predetermined threshold number, divide the first submap into second and third submaps, the at least one processor configured to divide being further configured to:
   identify a center of gravity of the feature points within the first submap;
   determine first displacements between the feature points the first submap and the identified center gravity; and
   assign the feature points of the first submap to the second submap or the third submap based on the first, displacements.

2. The information processing device according to claim 1 wherein the at least one processor is further configure to:
   generate status data corresponding to the submaps, the status data compromising (i) multidimensional normal distribution data including a mean vector representing the position and attitude of the camera and positions of each of the feature points in the submaps, and (ii) a variance-covariance matrix in correspondence with each of the submaps; and
   update the multidimensional normal distribution data corresponding to the submaps using the observation information.

3. The information processing device according to claim 2, wherein the variance-covariance matrix includes variances of inherent status values and position information about each of the feature points, and covariances corresponding to combinations of correlation information of different status values from among the status values, the inherent status values comprising at least one of the position or the attitude of the camera.

4. The information processing device according to claim 2 wherein the at least one processor is further configured to update the status data corresponding to the submaps using at least one of a Kalman filter or an Extended Kalman filter (EKF).

5. The information processing device according to claim 1, wherein, if the submaps are to be processed sequentially from a preceding submap to a current submap, the at least one processor is further configured to generate status data corresponding to the current submap directly using camera information included in status data corresponding to the preceding submap.

6. The information processing device according to claim 1 wherein the first and second submaps have at least one of the feature points in common.

7. The information processing device according to claim 1, wherein the at least one processor is further configured to divide the first submap into the second and third submaps by dividing a two-dimensional plane generated through projective transformation of the area into the first and second submaps, the first and second submaps having a predetermined size and overlapping areas therebetween.

8. The information processing device according to claim 1, wherein the at least one processor is further configured to correct positions of the feature points through bundle adjustment.

9. The information processing device according to claim 1, wherein the at least one processor is further configured to execute simultaneous localization and mapping (SLAM).

10. An information processing method executed in an information processing device, the method comprising the steps of:
    obtaining position and attitude of a camera and three-dimensional positions of feature points corresponding to successively receiving images from two or more different viewpoints, the images being captured using the camera, and the camera moving within a space generating one more submaps corresponding to an area for which the three-dimensional positions of the feature are to be calculated, the submaps are generated based on at least one of the number of captured frames or the capturing time;

determining whether a number of feature points included within first one of the submaps exceeds a predetermined threshold number; and when the number of feature points within the first submap exceed the predetermined threshold number, dividing the first submap into second and third submaps, the dividing comprising:

identifying a center of gravity of the feature points within the first submap;

determining first displacements between the feature points of the first submap and the identified of gravity; and assigning the feature points of the first submap to the second submaped or the third submap based on the first displacements.

11. A program embodied on a tangible, non-transitory computer readable medium that, when executed by a processor, causes the processor to perform a method, comprising:

obtaining position and attitude of a camera and three-dimensional positions of feature points corresponding to successively receiving images from two or more different viewpoints, the images being captured using the camera, and the camera moving within a space generating one or more submaps corresponding to an area for which the three-dimensional positions of the feature are to be calculated, the submaps are generated based on at least one of the number of captured frames or the capturing time;

determining whether a number of feature points included within a first one of the submaps exceeds a predetermined threshold number; and when the number points within the first submap exceeds the predetermined threshold number, dividing the first submap into second and third submaps, the dividing comprising:

identifying a center of gravity of the feature points within the first submap;

determining first displacements between the feature points of the first submap and the identified center of gravity; and assigning the feature points of the first submap to the second submap or the third submap based on the first displacements.

12. The information processing device of claim 1, wherein the at least one processor is further configured to update status data using observation information, the observation information including tracking information of the feature points, the status data including the three-dimensional positions of the feature points within the images and position and attitude information of the camera.

13. The information processing device of claim 1, wherein the at least one processor is configured to obtain the position and attitude of the camera and the three-dimensional positions of the feature points by generating status data for the submaps.

14. The information processing apparatus of claim 13, wherein the at least one processor is configured to update the generated status data by deleting, from the status data, information about feature points outside of a submap area for each of the generated submaps.

15. The information processing device of claim 1, wherein the at least one processor configured to divide is further configured to:

identify a corresponding one of the feature points associated with a maximum of the determined displacements;

determine second displacements between the feature points and the identified feature point;

establish an ordering of the feature points based on the second displacements; and assign a first subset of the ordered feature points to the second submap, and a second subset of the ordered feature points to the third submap.

16. The information processing device of claim 15, wherein at least one of the first or second subsets comprises a predetermined fraction of the number of feature points within the first submap.

17. The information processing device of claim 16, wherein the at least one processor configured to divide is further configured to:

determine whether the first submap overlaps at east one additional submap; and identify one or more feature points associated with the overlapping submaps, when the first submap overlaps the at least one additional submap; and assign a predetermined number of the identified features to at least one of the second submap or the third submap.

18. The information processing method of claim 10, further comprising:

obtaining the position and attitude of the camera and the three-dimensional positions of the feature points by generating status data for the submaps; and updating the status data using observation information, the observation information including includes tracking information of the feature points.

19. The program of claim 11, wherein the method further comprises:

obtaining the position and attitude of the camera and the three-dimensional positions of the feature points by generating status data for the submaps; and updating the status data using observation information, the observation information including includes tracking information of the feature points.

* * * * *